(12) United States Patent
Seo et al.

(10) Patent No.: US 8,886,021 B2
(45) Date of Patent: *Nov. 11, 2014

(54) RECORDING MEDIUM HAVING DATA STRUCTURE FOR MANAGING REPRODUCTION OF AT LEAST VIDEO DATA RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1046 days.

This patent is subject to a terminal disclaimer.

(21) Appl. No.: 10/715,462

(22) Filed: Nov. 19, 2003

(65) Prior Publication Data

US 2004/0101286 A1    May 27, 2004

(30) Foreign Application Priority Data

Nov. 20, 2002 (KR) .......................... 10-2002-072518

(51) Int. Cl.
| | | |
|---|---|---|
| H04N 5/84 | (2006.01) | |
| H04N 5/89 | (2006.01) | |
| H04N 5/92 | (2006.01) | |
| G11B 27/32 | (2006.01) | |
| G11B 27/34 | (2006.01) | |
| H04N 9/804 | (2006.01) | |
| H04N 21/482 | (2011.01) | |
| G11B 27/30 | (2006.01) | |
| G11B 27/10 | (2006.01) | |
| G11B 27/034 | (2006.01) | |
| H04N 21/432 | (2011.01) | |
| H04N 5/85 | (2006.01) | |
| H04N 9/806 | (2006.01) | |
| H04N 9/82 | (2006.01) | |

(52) U.S. Cl.
CPC .......... *H04N 21/4325* (2013.01); *G11B 27/329* (2013.01); *G11B 2220/20* (2013.01); *H04N 9/8063* (2013.01); *G11B 27/34* (2013.01); *H04N 9/8042* (2013.01); *H04N 21/4825* (2013.01); *G11B 27/3027* (2013.01); *G11B 2220/2562* (2013.01); *H04N 9/8205* (2013.01); *G11B 2220/213* (2013.01); *G11B 27/105* (2013.01); *G11B 27/034* (2013.01); *G11B 2220/2541* (2013.01); *G11B 2220/216* (2013.01); *H04N 5/85* (2013.01); *H04N 9/8227* (2013.01)
USPC ........... 386/336; 386/334; 386/335; 386/337; 386/244

(58) Field of Classification Search
USPC ..................... 386/124–126, 95, 334–335, 244
See application file for complete search history.

(56) References Cited

U.S. PATENT DOCUMENTS 4,777,357 A    10/1988 Harada et al.
(Continued)

FOREIGN PATENT DOCUMENTS

| CN | 1134583 | 10/1996 |
|---|---|---|
| CN | 1212427 | 3/1999 |

(Continued)

OTHER PUBLICATIONS

Japanese Office Action dated May 7, 2008 for JP 2004-515216.
(Continued)

*Primary Examiner* — Helen Shibru
(74) *Attorney, Agent, or Firm* — Harness, Dickey & Pierce

(57) ABSTRACT

The recording medium has a navigation area storing at least one navigation file. The navigation file includes navigation commands for managing reproduction of at least video data forming different parental control reproduction paths.

23 Claims, 15 Drawing Sheets

(56) References Cited

U.S. PATENT DOCUMENTS

| | | | |
|---|---|---|---|
| 5,521,898 A | 5/1996 | Ogasawara | |
| 5,559,808 A | 9/1996 | Kostreski et al. | |
| 5,583,652 A | 12/1996 | Ware | |
| 5,602,956 A | 2/1997 | Suzuki et al. | |
| 5,630,006 A | 5/1997 | Hirayama et al. | |
| 5,633,839 A | 5/1997 | Alexander et al. | |
| 5,651,010 A | 7/1997 | Kostreski et al. | |
| 5,691,972 A | 11/1997 | Tsuga et al. | |
| 5,703,997 A | 12/1997 | Kitamura et al. | |
| 5,729,549 A | 3/1998 | Kostreski et al. | |
| 5,732,185 A | 3/1998 | Hirayama et al. | |
| 5,734,788 A | 3/1998 | Nonomura et al. | |
| 5,742,569 A | 4/1998 | Yamamoto et al. | |
| 5,745,643 A | 4/1998 | Mishina | |
| 5,747,136 A | 5/1998 | Shono et al. | |
| 5,771,334 A | 6/1998 | Yamauchi et al. | |
| 5,784,528 A | 7/1998 | Yamane et al. | |
| 5,835,493 A | 11/1998 | Magee et al. | |
| 5,854,873 A | 12/1998 | Mori et al. | |
| 5,870,523 A | 2/1999 | Kikuchi et al. | |
| 5,877,817 A | 3/1999 | Moon | |
| 5,884,004 A | 3/1999 | Sato et al. | |
| 5,907,658 A | 5/1999 | Murase | |
| 5,909,257 A | 6/1999 | Ohishi et al. | |
| 5,913,010 A * | 6/1999 | Kaneshige et al. | 386/70 |
| 5,917,781 A | 6/1999 | Kim | |
| 5,923,869 A | 7/1999 | Kashiwagi et al. | |
| 5,933,410 A | 8/1999 | Nakane et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,953,290 A | 9/1999 | Fukuda et al. | |
| 5,987,126 A | 11/1999 | Okuyama et al. | |
| 5,999,694 A | 12/1999 | Yasuda et al. | |
| 5,999,698 A | 12/1999 | Nakai et al. | |
| 6,009,234 A | 12/1999 | Taira et al. | |
| 6,014,495 A | 1/2000 | Moriyama et al. | |
| 6,016,381 A | 1/2000 | Taira et al. | |
| 6,031,962 A | 2/2000 | Sawabe et al. | |
| 6,035,095 A | 3/2000 | Kaneshige et al. | |
| 6,064,385 A | 5/2000 | Sturgeon et al. | |
| 6,064,796 A | 5/2000 | Nakamura et al. | |
| 6,067,400 A | 5/2000 | Saeki et al. | |
| 6,084,581 A | 7/2000 | Hunt | |
| 6,097,676 A | 8/2000 | Fujinami | |
| 6,111,567 A | 8/2000 | Savchenko et al. | |
| 6,118,927 A | 9/2000 | Kikuchi et al. | |
| 6,130,869 A | 10/2000 | Tokoro et al. | |
| 6,167,189 A | 12/2000 | Taira et al. | |
| 6,175,681 B1 | 1/2001 | Kaneshige et al. | |
| 6,181,870 B1 | 1/2001 | Okada et al. | |
| 6,181,872 B1 | 1/2001 | Yamane et al. | |
| 6,195,726 B1 | 2/2001 | Hogan | |
| 6,215,746 B1 | 4/2001 | Ando et al. | |
| 6,219,488 B1 | 4/2001 | Mori et al. | |
| 6,222,805 B1 | 4/2001 | Mori et al. | |
| 6,229,952 B1 | 5/2001 | Nonomura et al. | |
| 6,246,402 B1 | 6/2001 | Setogawa et al. | |
| 6,247,022 B1 | 6/2001 | Yankowski | |
| 6,282,320 B1 * | 8/2001 | Hasegawa et al. | 382/233 |
| 6,285,825 B1 | 9/2001 | Miwa et al. | |
| 6,292,226 B1 | 9/2001 | Yamanaka et al. | |
| 6,308,005 B1 | 10/2001 | Ando et al. | |
| 6,308,006 B1 | 10/2001 | Yamamoto et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,345,147 B1 * | 2/2002 | Mimura et al. | 386/97 |
| 6,351,442 B1 | 2/2002 | Tagawa et al. | |
| 6,353,613 B1 | 3/2002 | Kubota et al. | |
| 6,356,971 B1 | 3/2002 | Katz et al. | |
| 6,360,055 B1 | 3/2002 | Kaneshige et al. | |
| 6,373,803 B2 | 4/2002 | Ando et al. | |
| 6,377,474 B1 | 4/2002 | Archambeault et al. | |
| 6,377,518 B1 | 4/2002 | Auwens et al. | |
| 6,377,747 B1 | 4/2002 | Murase et al. | |
| 6,381,404 B1 | 4/2002 | De Carmo | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,392,969 B1 | 5/2002 | Heo | |
| 6,393,430 B1 | 5/2002 | Van Ryzin | |
| 6,393,574 B1 | 5/2002 | Kashiwagi et al. | |
| 6,415,101 B1 | 7/2002 | De Carmo et al. | |
| 6,424,793 B1 | 7/2002 | Setogawa et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,515,101 B1 | 2/2003 | Sheares | |
| 6,532,334 B1 | 3/2003 | Kikuchi et al. | |
| 6,546,195 B2 | 4/2003 | Kashiwagi et al. | |
| 6,556,774 B2 | 4/2003 | Tsumagari et al. | |
| 6,564,006 B1 | 5/2003 | Mori et al. | |
| 6,567,608 B2 | 5/2003 | Mori et al. | |
| 6,570,837 B1 | 5/2003 | Kikuchi et al. | |
| 6,573,819 B1 | 6/2003 | Oshima et al. | |
| 6,580,870 B1 | 6/2003 | Kanazawa et al. | |
| 6,584,277 B2 | 6/2003 | Tsumagari et al. | |
| 6,603,517 B1 | 8/2003 | Shen et al. | |
| 6,615,192 B1 | 9/2003 | Tagawa et al. | |
| 6,618,396 B1 | 9/2003 | Kondo et al. | |
| 6,643,450 B1 * | 11/2003 | deCarmo | 386/94 |
| 6,647,496 B1 | 11/2003 | Tagawa et al. | |
| 6,654,543 B2 | 11/2003 | Ando et al. | |
| 6,700,839 B1 | 3/2004 | Auflick et al. | |
| 6,727,421 B2 | 4/2004 | Izawa et al. | |
| 6,763,345 B1 | 7/2004 | Hempleman et al. | |
| 6,766,103 B2 | 7/2004 | Kim et al. | |
| 6,782,192 B1 | 8/2004 | Tanaka et al. | |
| 6,788,883 B1 | 9/2004 | Park et al. | |
| 6,795,499 B1 | 9/2004 | Kato et al. | |
| 6,798,981 B1 | 9/2004 | Yamauchi et al. | |
| 6,801,713 B1 | 10/2004 | Yagawa et al. | |
| 6,832,293 B1 | 12/2004 | Tagawa et al. | |
| 6,859,421 B2 | 2/2005 | Sawabe et al. | |
| 6,901,078 B2 | 5/2005 | Morris | |
| 6,904,227 B1 | 6/2005 | Yamamoto et al. | |
| 6,912,218 B1 | 6/2005 | Jeon | |
| 6,914,863 B2 | 7/2005 | Ono | |
| 6,965,727 B1 | 11/2005 | Sawabe et al. | |
| 6,985,411 B2 * | 1/2006 | Kanegae et al. | 369/30.04 |
| 6,999,674 B1 | 2/2006 | Hamada et al. | |
| 7,006,758 B1 | 2/2006 | Yamamoto et al. | |
| 7,024,102 B1 | 4/2006 | Inoshita et al. | |
| 7,050,384 B2 | 5/2006 | Sasaki | |
| 7,065,287 B1 | 6/2006 | Heredia et al. | |
| 7,072,573 B2 | 7/2006 | Okada et al. | |
| 7,106,946 B1 | 9/2006 | Kato | |
| 7,113,693 B1 | 9/2006 | Chatani et al. | |
| 7,113,694 B2 | 9/2006 | Kim et al. | |
| 7,124,303 B2 | 10/2006 | Candelore et al. | |
| 7,236,687 B2 | 6/2007 | Kato et al. | |
| 7,477,833 B2 | 1/2009 | Kato et al. | |
| 7,565,060 B2 * | 7/2009 | Hamada et al. | 386/98 |
| 8,554,053 B2 * | 10/2013 | Yoo et al. | 386/244 |
| 8,731,369 B2 * | 5/2014 | Li et al. | 386/244 |
| 2001/0014070 A1 | 8/2001 | Ando et al. | |
| 2001/0026679 A1 | 10/2001 | Koshino et al. | |
| 2001/0030710 A1 | 10/2001 | Werner | |
| 2001/0033517 A1 | 10/2001 | Ando et al. | |
| 2001/0036358 A1 | 11/2001 | Kim et al. | |
| 2001/0038745 A1 * | 11/2001 | Sugimoto et al. | 386/95 |
| 2001/0043790 A1 * | 11/2001 | Saeki et al. | 386/65 |
| 2001/0053280 A1 | 12/2001 | Yamauchi et al. | |
| 2002/0001385 A1 | 1/2002 | Kawada et al. | |
| 2002/0015383 A1 | 2/2002 | Ueno | |
| 2002/0015581 A1 | 2/2002 | Ando et al. | |
| 2002/0018416 A1 | 2/2002 | Heo | |
| 2002/0021761 A1 | 2/2002 | Zhang et al. | |
| 2002/0031336 A1 | 3/2002 | Okada et al. | |
| 2002/0041557 A1 | 4/2002 | Heo | |
| 2002/0046328 A1 | 4/2002 | Okada | |

(56) References Cited

U.S. PATENT DOCUMENTS

| | | | |
|---|---|---|---|
| 2002/0076201 A1 | 6/2002 | Tsumagari et al. | |
| 2002/0093556 A1 | 7/2002 | Ishizawa et al. | |
| 2002/0093886 A1 | 7/2002 | Ijichi et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0114614 A1* | 8/2002 | Nakatani et al. | 386/52 |
| 2002/0126994 A1 | 9/2002 | Gunji et al. | |
| 2002/0127002 A1 | 9/2002 | Mori et al. | |
| 2002/0129036 A1 | 9/2002 | Ho Yuen Lok et al. | |
| 2002/0131767 A1* | 9/2002 | Auwens et al. | 386/95 |
| 2002/0135607 A1 | 9/2002 | Kato et al. | |
| 2002/0135608 A1 | 9/2002 | Hamada et al. | |
| 2002/0145702 A1 | 10/2002 | Kato et al. | |
| 2002/0150383 A1 | 10/2002 | Kato et al. | |
| 2002/0159368 A1 | 10/2002 | Noda et al. | |
| 2002/0177914 A1 | 11/2002 | Chase | |
| 2002/0180803 A1 | 12/2002 | Kaplan et al. | |
| 2002/0196365 A1 | 12/2002 | Cho et al. | |
| 2002/0197059 A1 | 12/2002 | Cho et al. | |
| 2003/0002194 A1 | 1/2003 | Andoh | |
| 2003/0007780 A1 | 1/2003 | Senoh | |
| 2003/0026597 A1 | 2/2003 | Cho et al. | |
| 2003/0035681 A1 | 2/2003 | Ho | |
| 2003/0046638 A1 | 3/2003 | Thompson | |
| 2003/0058948 A1 | 3/2003 | Kelly et al. | |
| 2003/0086568 A1* | 5/2003 | Kato et al. | 380/201 |
| 2003/0103604 A1 | 6/2003 | Kato et al. | |
| 2003/0118327 A1 | 6/2003 | Um et al. | |
| 2003/0123346 A1 | 7/2003 | Ishii et al. | |
| 2003/0123845 A1 | 7/2003 | Koda et al. | |
| 2003/0123849 A1 | 7/2003 | Nallur et al. | |
| 2003/0133509 A1 | 7/2003 | Yanagihara et al. | |
| 2003/0147322 A1 | 8/2003 | Ono | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2004/0014136 A1 | 1/2004 | Ishii et al. | |
| 2004/0019396 A1 | 1/2004 | McMahon et al. | |
| 2004/0047588 A1 | 3/2004 | Okada et al. | |
| 2004/0047591 A1 | 3/2004 | Seo et al. | |
| 2004/0047923 A1 | 3/2004 | Turpen et al. | |
| 2004/0076402 A1 | 4/2004 | Jung et al. | |
| 2004/0086261 A1 | 5/2004 | Hanes | |
| 2004/0114908 A1 | 6/2004 | Ito | |
| 2004/0120694 A1* | 6/2004 | Hamada et al. | 386/95 |
| 2004/0156621 A1 | 8/2004 | Seo et al. | |
| 2004/0179819 A1 | 9/2004 | Cho et al. | |
| 2004/0179820 A1 | 9/2004 | Kashiwagi et al. | |
| 2004/0179823 A1 | 9/2004 | Jung et al. | |
| 2004/0179827 A1 | 9/2004 | Cho et al. | |
| 2004/0208135 A1 | 10/2004 | Nakamura et al. | |
| 2004/0213105 A1 | 10/2004 | Seo et al. | |
| 2004/0220791 A1 | 11/2004 | Lamkin et al. | |
| 2004/0247290 A1 | 12/2004 | Seo et al. | |
| 2004/0252975 A1 | 12/2004 | Cho et al. | |
| 2005/0019007 A1 | 1/2005 | Kato et al. | |
| 2005/0025459 A1 | 2/2005 | Kato et al. | |
| 2005/0036763 A1 | 2/2005 | Kato et al. | |
| 2005/0063671 A1 | 3/2005 | Jung et al. | |
| 2005/0063672 A1 | 3/2005 | Jung et al. | |
| 2005/0232111 A1 | 10/2005 | Sawabe et al. | |
| 2006/0013564 A1 | 1/2006 | Hamada et al. | |
| 2006/0110132 A1 | 5/2006 | Takakuwa et al. | |
| 2006/0222340 A1 | 10/2006 | Yamauchi et al. | |
| 2008/0019672 A1* | 1/2008 | Hamasaka et al. | 386/124 |
| 2008/0253742 A1* | 10/2008 | Hamada et al. | 386/95 |
| 2009/0180757 A1* | 7/2009 | De Haan | 386/95 |

FOREIGN PATENT DOCUMENTS

| | | |
|---|---|---|
| CN | 1216196 | 5/1999 |
| CN | 1220458 | 6/1999 |
| CN | 1237852 | 12/1999 |
| CN | 1239574 A | 12/1999 |
| CN | 1251461 | 4/2000 |
| CN | 1321319 | 5/2000 |
| CN | 1264894 | 8/2000 |
| CN | 1272209 | 11/2000 |
| CN | 1310445 | 8/2001 |
| CN | 1320926 | 11/2001 |
| CN | 1346491 | 4/2002 |
| CN | 1393872 | 1/2003 |
| CN | 1251680 | 8/2003 |
| CN | 1205793 | 11/2003 |
| CN | 1163673 | 6/2004 |
| CN | 1509572 | 6/2004 |
| CN | 1263345 | 9/2004 |
| CN | 1555058 | 12/2004 |
| CN | 1571055 | 1/2005 |
| CN | 1606355 | 4/2005 |
| CN | 1606356 | 4/2005 |
| CN | 1606357 | 4/2005 |
| CN | 1611071 | 4/2005 |
| CN | 1364387 | 11/2005 |
| CN | 1383679 | 1/2006 |
| EP | 0 677 842 | 10/1995 |
| EP | 0723216 | 7/1996 |
| EP | 0724264 | 7/1996 |
| EP | 0737009 | 10/1996 |
| EP | 0737980 | 10/1996 |
| EP | 0831647 | 3/1998 |
| EP | 0836183 | 4/1998 |
| EP | 0836189 | 4/1998 |
| EP | 0847198 | 6/1998 |
| EP | 0858073 | 8/1998 |
| EP | 0872839 | 10/1998 |
| EP | 0873022 | 10/1998 |
| EP | 0 911 825 | 4/1999 |
| EP | 0 917 149 | 5/1999 |
| EP | 0917355 | 5/1999 |
| EP | 0918438 | 5/1999 |
| EP | 0920203 | 6/1999 |
| EP | 0 929 072 | 7/1999 |
| EP | 0940983 | 9/1999 |
| EP | 0949622 | 10/1999 |
| EP | 1024494 | 8/2000 |
| EP | 1050880 | 11/2000 |
| EP | 1081885 | 3/2001 |
| EP | 1103974 | 5/2001 |
| EP | 1126454 | 8/2001 |
| EP | 1041565 | 9/2001 |
| EP | 1148503 | 10/2001 |
| EP | 1 271 526 | 1/2002 |
| EP | 1041569 | 1/2002 |
| EP | 1198132 | 4/2002 |
| EP | 1198133 | 4/2002 |
| EP | 1202568 | 5/2002 |
| EP | 1205933 | 5/2002 |
| EP | 1469677 | 10/2002 |
| EP | 1 280 347 | 1/2003 |
| EP | 1280348 | 1/2003 |
| EP | 1 286 544 | 2/2003 |
| EP | 1398965 | 3/2004 |
| EP | 1 516 329 | 3/2005 |
| EP | 1 521 463 | 4/2005 |
| EP | 1391119 | 6/2006 |
| JP | 64-003781 | 1/1989 |
| JP | 01-116819 | 5/1989 |
| JP | 3-199243 | 8/1991 |
| JP | 2002-158974 | 5/1992 |
| JP | 08-088832 | 4/1996 |
| JP | 08-235833 | 9/1996 |
| JP | 08-273304 | 10/1996 |
| JP | 09-023403 | 1/1997 |
| JP | 09-135421 | 5/1997 |
| JP | 09-251759 | 9/1997 |
| JP | 10-032780 | 2/1998 |
| JP | 10-40667 | 2/1998 |
| JP | 10-051737 | 2/1998 |
| JP | 10-269698 | 10/1998 |
| JP | 10-271449 | 10/1998 |

(56) References Cited

FOREIGN PATENT DOCUMENTS

| | | |
|---|---|---|
| JP | 10-299698 | 11/1998 |
| JP | 10340570 | 12/1998 |
| JP | 11-041563 | 2/1999 |
| JP | 11-69308 | 3/1999 |
| JP | 11-69309 | 3/1999 |
| JP | 11-96653 | 4/1999 |
| JP | 11-103444 | 4/1999 |
| JP | 11-120747 | 4/1999 |
| JP | 11-134812 | 5/1999 |
| JP | 10-032780 | 6/1999 |
| JP | 11-161663 | 6/1999 |
| JP | 11-185463 | 7/1999 |
| JP | 11-213522 | 8/1999 |
| JP | 11-213627 | 8/1999 |
| JP | 11-259976 | 9/1999 |
| JP | 11-259985 | 9/1999 |
| JP | 2002-150685 | 9/1999 |
| JP | 1999-296997 | 10/1999 |
| JP | 11-346341 | 12/1999 |
| JP | 2000-001130 | 1/2000 |
| JP | 2000-021130 | 1/2000 |
| JP | 2000-030414 | 1/2000 |
| JP | 2000-041066 | 2/2000 |
| JP | 2000-067522 | 3/2000 |
| JP | 2000-069437 | 3/2000 |
| JP | 2000-113602 | 4/2000 |
| JP | 2000-149405 | 5/2000 |
| JP | 2000-149514 | 5/2000 |
| JP | 2000-195235 | 7/2000 |
| JP | 2000-222822 | 8/2000 |
| JP | 2000-235779 | 8/2000 |
| JP | 2000-235780 | 8/2000 |
| JP | 2000-236496 | 8/2000 |
| JP | 2000-293938 | 10/2000 |
| JP | 2000-299836 | 10/2000 |
| JP | 2000298918 | 10/2000 |
| JP | 12-331466 | 11/2000 |
| JP | 2000-322827 | 11/2000 |
| JP | 2000-322875 | 11/2000 |
| JP | 2000-348442 | 12/2000 |
| JP | 2000-348467 | 12/2000 |
| JP | 2001-024985 | 1/2001 |
| JP | 2001-067802 | 3/2001 |
| JP | 2001-111929 | 4/2001 |
| JP | 2001-111960 | 4/2001 |
| JP | 2001-157145 | 6/2001 |
| JP | 2001-157208 | 6/2001 |
| JP | 2001-169246 | 6/2001 |
| JP | 2001-195809 | 7/2001 |
| JP | 2001-297535 | 10/2001 |
| JP | 2001-332006 | 11/2001 |
| JP | 2001-359072 | 12/2001 |
| JP | 2002-025231 | 1/2002 |
| JP | 2002-056651 | 2/2002 |
| JP | 2002-082838 | 3/2002 |
| JP | 2002-083486 | 3/2002 |
| JP | 2002-084488 | 3/2002 |
| JP | 2002-112179 | 4/2002 |
| JP | 2002-157838 | 5/2002 |
| JP | 2002-157859 | 5/2002 |
| JP | 2002-158972 | 5/2002 |
| JP | 2002-158974 | 5/2002 |
| JP | 3392838 | 5/2002 |
| JP | 2002-216460 | 8/2002 |
| JP | 2002-222581 | 8/2002 |
| JP | 2002-288942 | 10/2002 |
| JP | 2002-112201 | 12/2002 |
| JP | 2002-352515 | 12/2002 |
| JP | 2003-006979 | 1/2003 |
| JP | 2003-059241 | 2/2003 |
| JP | 3379961 | 2/2003 |
| JP | 3392849 | 2/2003 |
| JP | 2003-068057 | 3/2003 |
| JP | 2003-087744 | 3/2003 |
| JP | 2003-116100 | 4/2003 |
| JP | 2003-199047 | 7/2003 |
| JP | 2003-520514 | 7/2003 |
| JP | 2003-233952 | 8/2003 |
| JP | 2004-127397 | 4/2004 |
| JP | 2005-513936 | 5/2005 |
| JP | 2005-251392 | 9/2005 |
| KR | 1996-38743 | 11/1996 |
| KR | 1996-38744 | 11/1996 |
| KR | 1996-38901 | 11/1996 |
| KR | 1996-38905 | 11/1996 |
| KR | 10-1999-0022111 | 3/1999 |
| KR | 1999-022858 | 3/1999 |
| KR | 0178246 | 4/1999 |
| KR | 1999-0079482 | 11/1999 |
| KR | 2000-0031861 | 6/2000 |
| KR | 2000-0053633 | 8/2000 |
| KR | 2000-0055028 | 9/2000 |
| KR | 2000-0056179 | 9/2000 |
| KR | 2000-0065876 | 11/2000 |
| KR | 2001-0022702 | 3/2001 |
| KR | 10-0294884 | 4/2001 |
| KR | 2001-0028735 | 4/2001 |
| KR | 2001-0051898 | 6/2001 |
| KR | 2001-0098007 | 11/2001 |
| KR | 2001-0098101 | 11/2001 |
| KR | 2001-0107578 | 12/2001 |
| KR | 2002-0006273 | 1/2002 |
| KR | 2002-0006674 | 1/2002 |
| KR | 2002-0020919 | 3/2002 |
| KR | 10-2002-0094018 | 12/2002 |
| KR | 2002-0097454 | 12/2002 |
| KR | 2002-0097455 | 12/2002 |
| KR | 10-0381290 | 4/2003 |
| KR | 2004-0000290 | 1/2004 |
| KR | 2004-0030992 | 4/2004 |
| KR | 2004-0030994 | 4/2004 |
| KR | 2004-0030995 | 4/2004 |
| KR | 2004-0041581 | 5/2004 |
| RU | 96101175 | 3/1995 |
| RU | 2229174 | 5/2004 |
| TW | 391548 | 5/2000 |
| WO | WO 97/13361 | 4/1997 |
| WO | WO 97/13364 | 4/1997 |
| WO | WO 97/13365 | 4/1997 |
| WO | WO 97/13366 | 4/1997 |
| WO | WO 97/14151 | 4/1997 |
| WO | WO 97/15924 | 5/1997 |
| WO | WO97-13363 | 10/1997 |
| WO | WO 97/37491 | 10/1997 |
| WO | WO 97/38527 | 10/1997 |
| WO | WO 97/39451 | 10/1997 |
| WO | WO 98/00952 | 1/1998 |
| WO | WO 98/09290 | 3/1998 |
| WO | WO99/08281 | 2/1999 |
| WO | WO99/38169 | 7/1999 |
| WO | WO 00/02195 | 1/2000 |
| WO | WO 00/05883 | 2/2000 |
| WO | WO 00/42515 | 7/2000 |
| WO | WO 00-49803 | 8/2000 |
| WO | WO 00/46803 | 10/2000 |
| WO | WO00/60597 | 10/2000 |
| WO | WO 00/62295 | 10/2000 |
| WO | WO 01/35648 | 5/2001 |
| WO | WO 01/35650 | 5/2001 |
| WO | WO01/52554 | 7/2001 |
| WO | WO01/82604 | 11/2001 |
| WO | WO01/82606 | 11/2001 |
| WO | WO 01/82608 | 11/2001 |
| WO | WO 01/82609 | 11/2001 |
| WO | WO01/82610 | 11/2001 |
| WO | WO 01/82611 | 11/2001 |
| WO | WO 02/075739 | 9/2002 |
| WO | WO 02/079902 | 10/2002 |
| WO | WO02/080541 | 10/2002 |
| WO | WO03/047261 | 6/2003 |
| WO | WO03/058957 | 7/2003 |
| WO | WO2004/001728 | 12/2003 |
| WO | WO 2004/001749 | 12/2003 |
| WO | WO2004/001750 | 12/2003 |

(56) References Cited

FOREIGN PATENT DOCUMENTS

| WO | WO 2004/001752 | 12/2003 |
|---|---|---|
| WO | WO2004/001753 | 12/2003 |
| WO | WO2004/001754 | 12/2003 |
| WO | WO 2004/032142 | 4/2004 |
| WO | WO 2004/045206 | 5/2004 |
| WO | WO 2004/047100 | 6/2004 |
| WO | WO 2004/075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |
| WO | WO 2004/088661 | 10/2004 |
| WO | WO 2004/098183 | 11/2004 |

OTHER PUBLICATIONS

Japanese Office Action dated May 20, 2008 for counterpart Japanese application.
Search Report issued by European Patent Office, dated Sep. 12, 2008 for corresponding European application.
Office Action by Russian Patent Office dated Jan. 27, 2009 for counterpart Russian application No. 2005-126860/28.
Office Action by Russian Patent Office dated Jan. 27, 2009 for counterpart Russian application No. 2005-126865/28.
Office Action by Japanese Patent Office dated Mar. 3, 2009 for counterpart Japanese application No. 2004-515201.
Office Action by Japanese Patent Office for counterpart Japanese application, dated Sep. 16, 2008.
Office Action by Australian Patent Office for counterpart Australian application No. 2003241205, dated Sep. 11, 2008.
Office Action by Australian Patent Office for counterpart Australian application No. 2003240036, dated Sep. 11, 2008.
Office Action by Australian Patent Office for counterpart Australian application No. 2003228113, dated Sep. 17, 2008.
Office Action by Chinese Patent Office dated Sep. 5, 2008 for counterpart Chinese application.
Office Action by Japanese Patent Office received Nov. 18, 2008 for counterpart Japanese application.
Article: "DVD-Video Format" by Hideki Mimura.
Article: "DVD Overview" by Hisahi Yamada.
Office Action dated Jul. 28, 2009 by Japanese Patent Office for counterpart Japanese application.
Search Report dated Aug. 12, 2009 by European Patent Office for counterpart European Application No. 03772918.
Search Report dated Aug. 12, 2009 by European Patent Office for counterpart European Application No. 03772919.
Search Report dated Aug. 12, 2009 by European Patent Office for counterpart European Application No. 03772920.
Search Report dated Nov. 12, 2009 by European Patent Office for counterpart European Application No. 04714511.5.
Office Action dated Feb. 5, 2010 by Japanese Patent Office for counterpart Japanese Application No. 2008-314833.
Office Action dated May 27, 2010 by Korean Patent Office for Korean Application No. 10-2005-7015057.
Office Action for corresponding European Application No. 04 714 036.3 dated Feb. 15, 2013.
Japanese Office Action dated May 10, 2011 for Japanese Appln. No. 2009-33144.
Summons to attend Oral Proceedings for European Application No. 03733602.1 dated Sep. 20, 2012.
Office Action by the Chinese Patent Office dated Jun. 8, 2012, for Chinese Application No. 2009/101036475.2, with English Translation.
Taylor J Ed—Taylor J: "DVD Demystified, Application Details: DVD Video and DVD-Audio", Jan. 1, 2001, DVD Demystifieo, McGraw-Hill, New York, US, pp. 260-273.
Office Action for corresponding European Application No. 03 730 901.0 dated Mar. 20, 2014.
Chinese Patent Gazette dated Dec. 1. 2010 issued in corresponding Chinese Application No. 200380100240.9.
Office Action for corresponding European Application No. 04 714 037.1 dated Aug. 5, 2014.
Taylor J Ed—Taylor J: "DVD Demystified, Application Details: DVD Video and DVD-Audio", Jan. 1, 2001, DVD Demystifieo, Mcgraw-Hill, New York, US, pp. 254-290.
Japanese Office Action dated May 7, 2008 for JP 2004-515203.
Japanese Office Action dated May 7, 2008 for JP 8-273304.
Japanese Office Action dated May 7, 2008 for JP 2004-515216.

\* cited by examiner

*info.dvp - syntax*

| info.dvp { |
|---|
| version_number |
| TableOfPlayLists_start_address |
| reserved_for_future_use |
| ⋮ |
| TableOfPlayLists(){ |
| length |
| number_of_PlayLists |
| for(I=0; i<number_of_PlayLists; i++){ |
| PlayList_file_name |
| path_number |
| ............ |
| } |
| } |
| ⋮ |

*\*.rpls - syntax*

| xxxxx.rpls { |
|---|
| version_number |
| .......... |
| PlayList(){ |
| length |
| .......... |
| number_of_PlayItems |
| for(i=0; i<number_of_Playitems; i++){ |
| PlayItem() |
| ⋮ |

| PlayItem(){ |
|---|
| length |
| ..... |
| path_number |
| ..... |

```
PlayList_Linker () {
    Length
    Path_type
    Number_of_PlayLists
    for (I=0; j<number_of_PlayLists; j++) {
        Pre-Command ()
        PlayList_file_name
        Post-Command ()
    }
}
```

RECORDING MEDIUM HAVING DATA STRUCTURE FOR MANAGING REPRODUCTION OF AT LEAST VIDEO DATA RECORDED THEREON AND RECORDING AND REPRODUCING METHODS AND APPARATUSES

FOREIGN PRIORITY

The present invention claims priority under 35 U.S.C. 119 on Korean Application No. 10-2002-0072518 filed Nov. 20, 2002; the contents of which are incorporated by reference in their entirety.

BACKGROUND OF THE INVENTION

1. Field of the Invention

The present invention relates to a recording medium having a data structure for managing reproduction of data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clips or clip files. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium according to the present invention includes a data structure for managing reproduction of at least video data recorded on the recording medium.

In one exemplary embodiment, the recording medium includes a navigation area storing at least one navigation file. The navigation file includes navigation commands for managing reproduction of at least video data forming different parental control reproduction paths.

In one exemplary embodiment, the navigation commands may instruct playback of at least one playlist recorded on the recording medium for each of the different parental control reproduction paths. For example, the navigation commands may selectively determine which playlist from a group of at least two playlists recorded on the recording medium to playback based on a selected parental control reproduction path. In one exemplary embodiment, the navigation commands selectively determine which of the playlists to playback based on user input indicating the selected parental control reproduction path.

In another exemplary embodiment, the navigation commands are divided into navigation command groups, and each of the different parental control reproduction paths has at least one navigation command group associated therewith. For example, a number of the navigation command groups selectively determine which playlist from a group of at least two playlists recorded on the recording medium to playback based on a selected parental control reproduction path. In one exemplary embodiment, the number of the navigation command groups selectively determine which of the playlists to playback based on user input indicating the selected parental control reproduction path. Furthermore, in one exemplary embodiment, each navigation command group associated with a different parental reproduction path is associated with only one of the different parental reproduction paths.

In a further exemplary embodiment, the recording medium includes a playlist area storing at least one playlist associated with each of the different parental control reproduction paths. Each playlist identifyies at least a portion of a clip file forming at least a portion of one of audio and video data recorded on the recording medium. In one exemplary embodiment, each playlist is associated with only one of the different parental control reproduction paths. In another exemplary embodiment, at least two playlists, each associated with a different one of the different parental control reproduction paths, identify a same clip file. In a still further exemplary embodiment, at least two playlists, each associated with a different one the different parental control reproduction paths, identify a same portion of a same clip file. In yet another exemplary embodiment, at least two playlists, each associated with a different one of the different parental control reproduction paths, identify different clip files representing a same portion of a title.

In another exemplary embodiment of the present invention, the navigation commands are divided into navigation command groups and the navigation file further includes a length indicator indicating a length of the navigation file, an attribute indicator providing an indication of at least one attribute of the navigation file, and a number of navigation command groups indicator indicating a number of the navigation command groups in the navigation file.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

In order that the invention may be fully understood, exemplary embodiments thereof will now be described with reference to the accompanying drawings.

Figure 1:
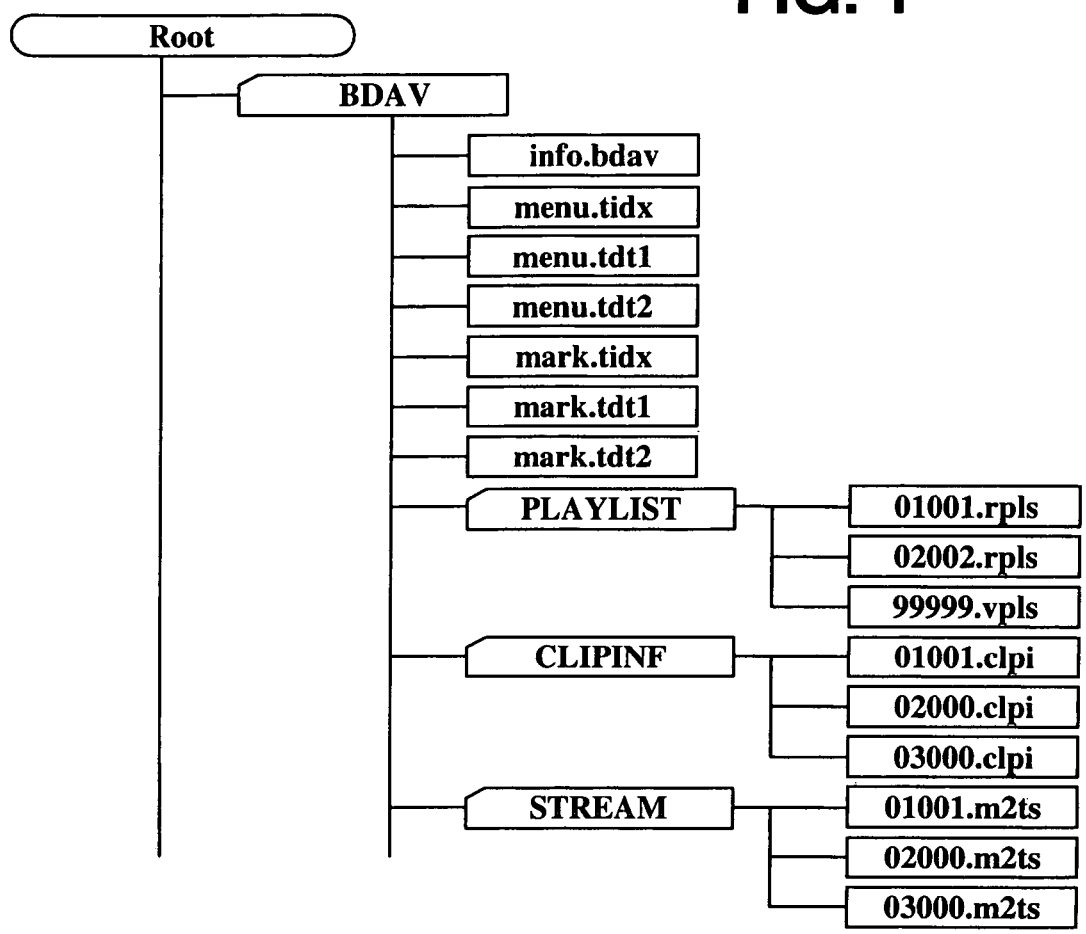
FIG. 1 illustrates the prior art file or data structure of a rewritable optical disk according to the Blu-ray Disc Rewritable (BD-RE) standard.
Figure 2:
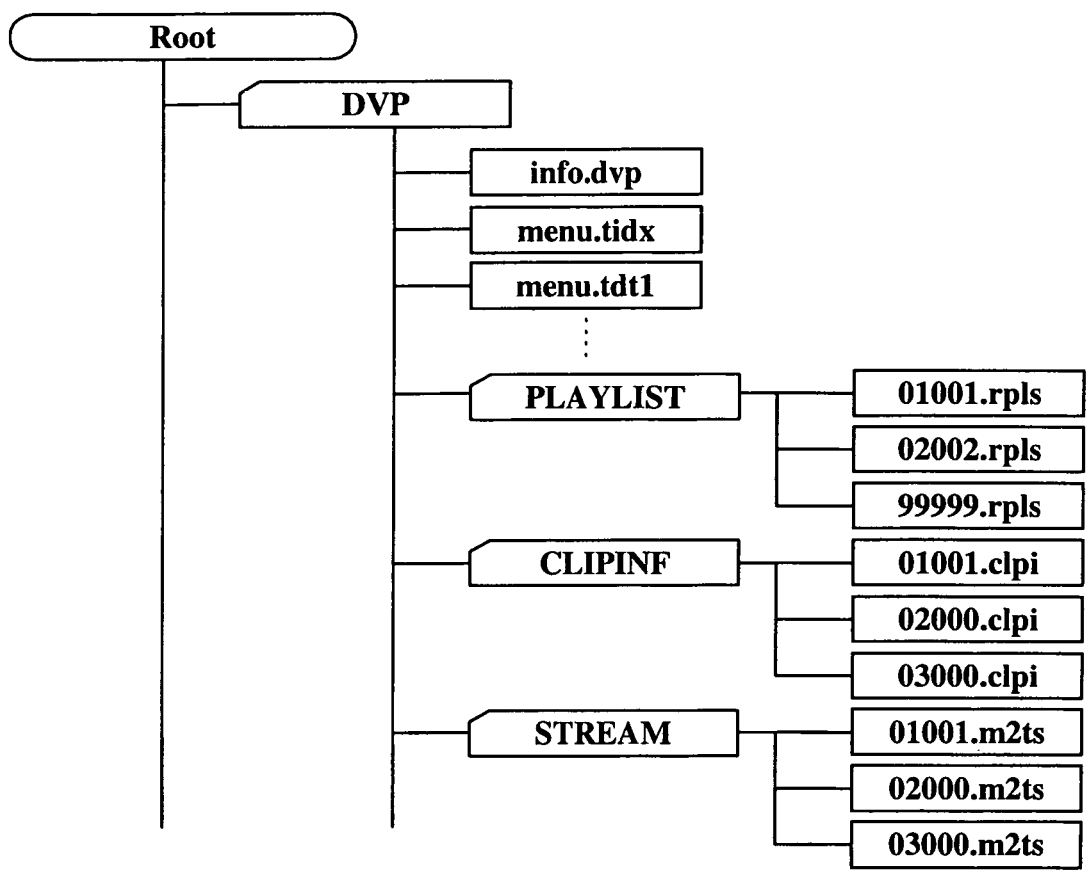
FIG. 2 illustrates an exemplary embodiment of a recording medium file or data structure according to the present invention.

A high-density recording medium such as a high density optical disk (e.g., a Blu-Ray ROM (BD-ROM), BD-RE, etc.) in accordance with the invention may have a file or data structure for managing reproduction of video and audio data as shown in FIG. 2. Many aspects of the data structure according to the present invention shown in FIG. 2 are similar to that of the BD-RE standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

Figure 3:
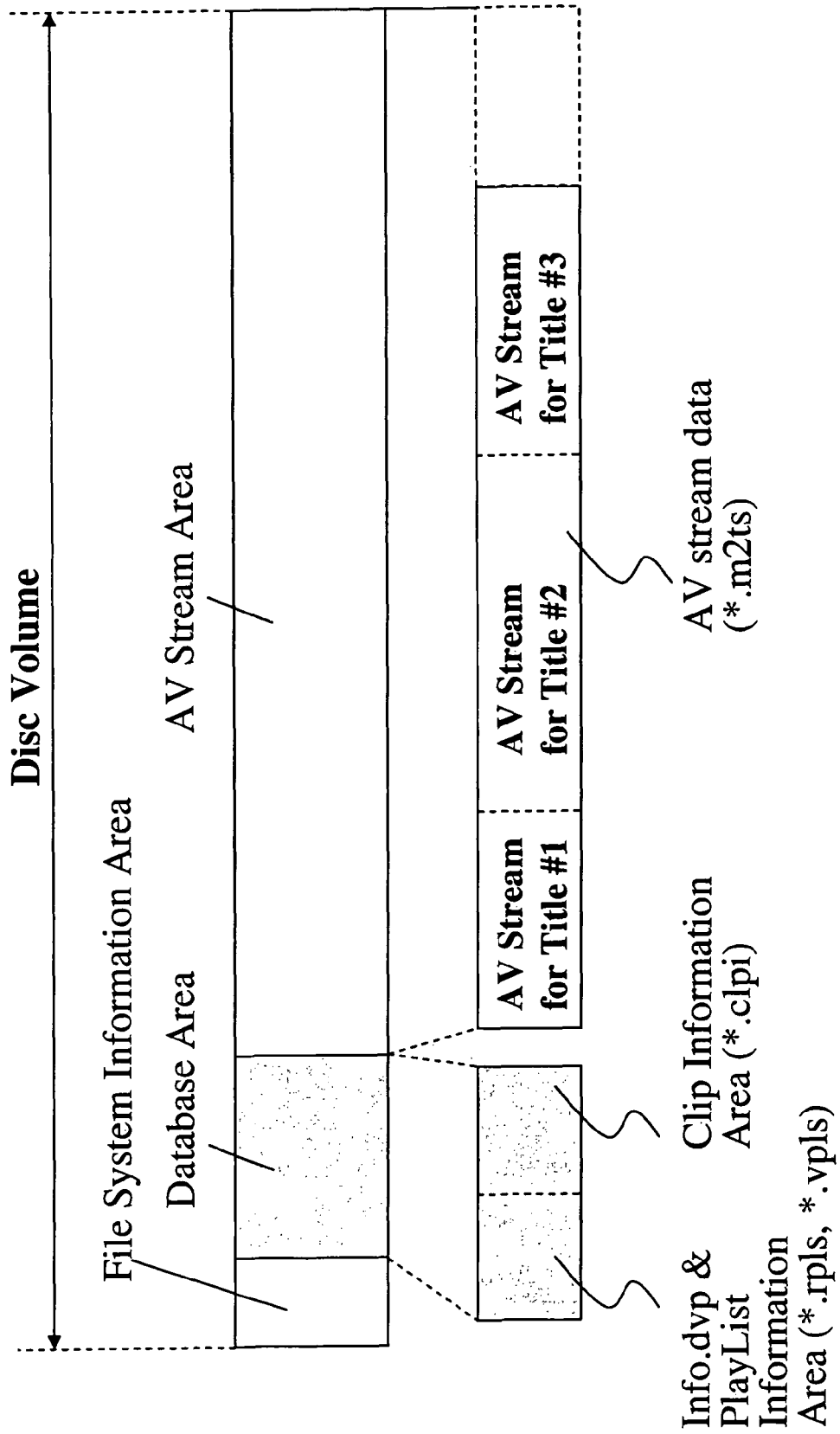
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

A multiple reproduction path data stream, for instance, a multi-story, a multi-parental-level, or a multi-angle data stream recorded as a title in a physical data recording area of a recording medium (e.g., a BD-ROM) may be managed as a plurality of clip files. For example, clip files 1-3 shown in FIG. 4A correspond to a title and the A/V streams recorded in the clip files are in the form of MPEG2-formatted transport packets (TPs).

The TPs of the multi-path data stream contain packet IDs (PIDs) unique to each of the paths (e.g., different angles) for identifying the path. The TPs (TP1) of clip file 1 corresponding to path 1 include the information that Video_PID=A and Audio_PID=P and the TPs (TP2) of clip file 2 corresponding to path 2 include the information that Video_PID=B and Audio_PID=R. Likewise, the TPs (TP3) of clip file 3 corresponding to path 3 include the information that Video_PID=C and Audio_PID=S.

The TPs of the clip files 1, 2, and 3 corresponding to paths 1, 2, and 3 respectively are recorded in the AV stream area within the physical data recording area of, for example, the BD-ROM in an interleaved manner. The TPs for the multiple reproduction paths are interleaved on a PID basis as interleave blocks, each of which contains at least one I-picture. And, the first transport packet of each interleave block is the first transport packet of an I-picture.

Figure 4A:
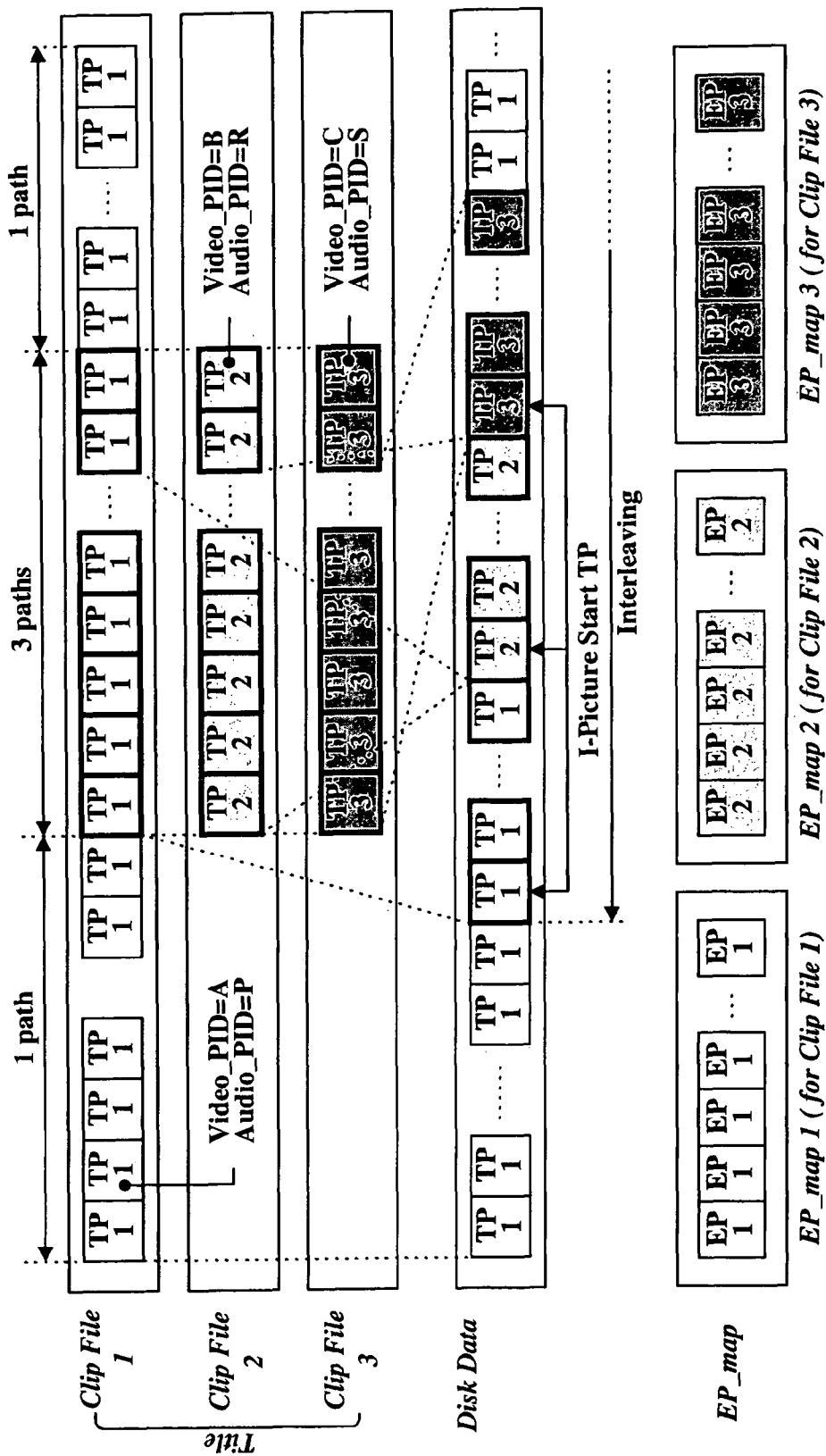
FIG. 4A illustrate a first detailed embodiment of the clip files, disk data and EP map for use in the data structure according to FIG. 2.

Clip information files 1, 2, and 3 corresponding to clip files 1, 2, and 3, respectively, include search information for selectively accessing TPs of each reproduction path. For example, as shown in FIG. 4A, each clip information file includes one or more entry point (EP) maps containing the presentation time stamps (PTSs) mapping to source packet numbers (SPNs) of the TPs in an associated clip file. In one exemplary embodiment, a one-to-one relationship exists between the EP maps and the number of paths included in the multiple reproduction path data stream. In the example of FIG. 4A, three EP maps 1, 2, 3 corresponding to the clip files 1, 2, and 3, respectively, are created and recorded in the corresponding clip information files 1, 2, and 3.

Figure 4B:
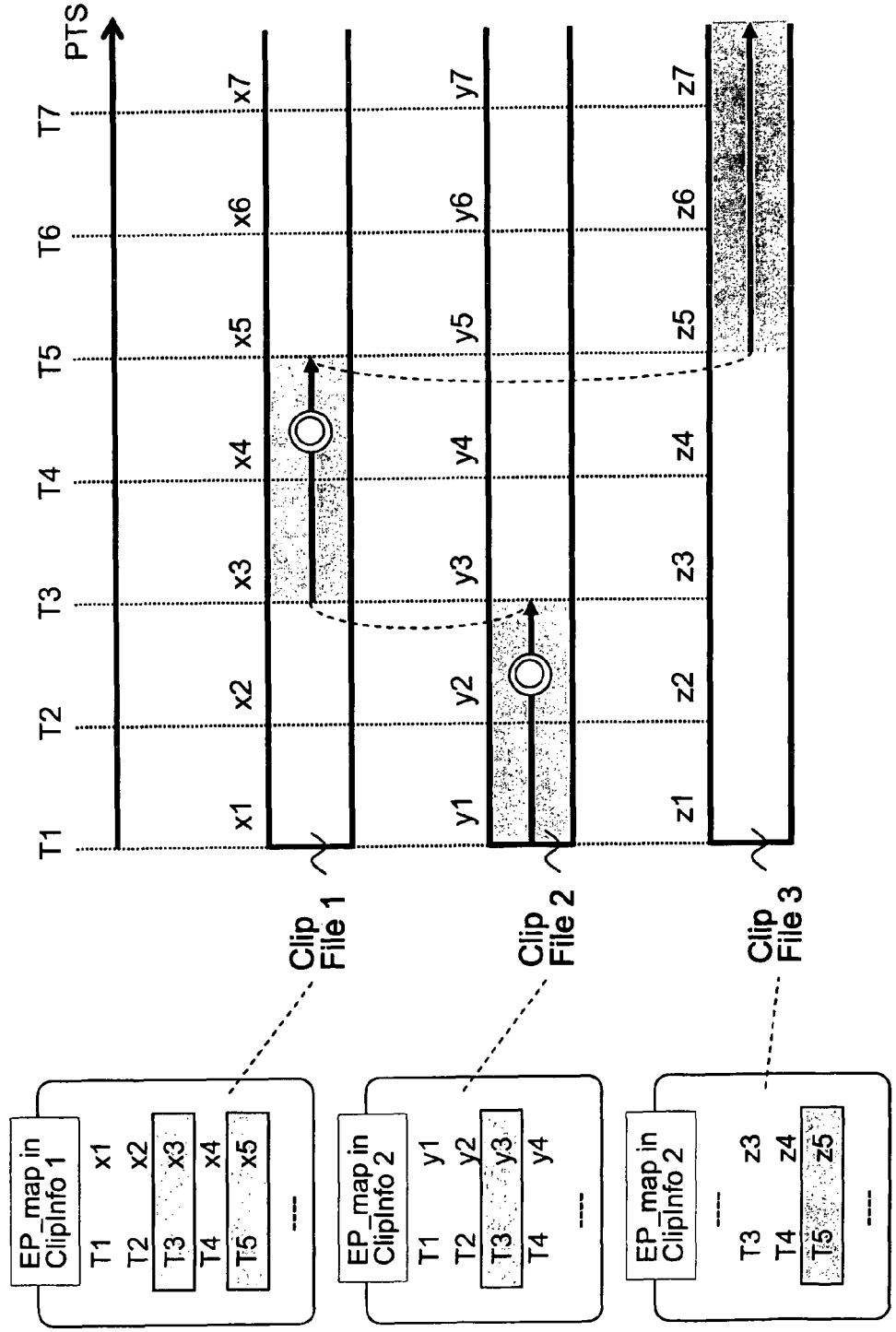
FIG. 4B illustrates the time alignment that exists between the EP maps for the different clip files.

FIG. 4B illustrates the time alignment that exists between the EP maps for the different clip files. As discussed, an EP map maps the presentation time stamp information such as indicated in a playitem to a source packet. More particularly, the presentation time stamp is mapped to the address or identifier of the source packet. The address or identifier is the source packet number (SPN). FIG. 4B further shows the source packets by source packet number along the presentation time stamp axis for each clip file 1, 2, and 3. As shown, source packets in each of the EP maps 1, 2, and 3 have the same presentation time stamps. For example, source packet x1 from the first clip file 1, source packet y1 from the second clip file 2 and source packet z1 from the third clip file 3 have the same presentation time stamp T1. As such, the EP maps 1, 2 and 3 are time-aligned. Because of this time-alignment, seamless reproduction of video data is possible even when the reproduction path is changed during reproduction. FIG. 4B illustrates changes in reproduction path by two concentric circles. As shown, if a user decides to change the reproduction path from clip file 2 to clip file 1 during reproduction of source packet y2, then after completing reproduction of source packet y2, source packet x3 is the next source packet reproduced. Similarly if a user decides to change reproduction path (e.g., change camera angle to view) from clip file 1 to clip file 3 during reproduction of source packet x4, then after completing reproduction of source packet x4, source packet z5 is reproduced. It will be understood that the source packet numbers given in the example above are merely exemplary, and that a source packet in one clip file will not, generally, have the same source packet number as a time aligned source packet in another clip file.

Figures 5, 6:
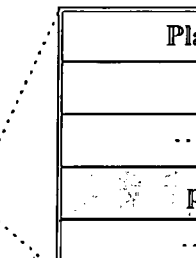
FIGS. 5 and 6 illustrate first and second embodiments of the data structure for reproduction path management information for use in the data structure according to FIG. 2.

FIG. 5 illustrates a portion of the general information file info.dvp according to an embodiment of the present invention. As shown, the general information file info.dvp includes an information field called 'TableOfPlaylists'. The playlist table 'TableOfPlaylists' information field indicates the length of the information field, and the number of playlists in the PLAYLIST directory. For each playlist, the playlist table 'TableOfPlaylists' indicates the file name 'PlayList_file_name' of the playlist (which identifies the playlist) and a path number 'Path_number'. The path number 'Path_number' provides path management information by indicating the path or paths to which the associated playlist belongs. In the embodiment of FIGS. 4A-4B, one clip corresponds to each path. Accordingly, each playlist file includes one playitem, which points to the one clip associated with the same path as the playlist file. It should be understood, however, that the present invention is not limited to this structure.

In another exemplary embodiment of the present invention, the playlist table 'TableOfPlaylists' does not include path management information. In this embodiment, illustrated in FIG. 6, the path management information is provided in the playlist files. As shown, each playlist file indicates a length of the file, and the number of playitems 'number_of_PlayItems' forming the playlist. For each playitem, a playitem information field is provided in the playlist file. Here, each playitem is identified by the number of the playitem. As shown in FIG. 6, the playitem information field includes, in part, an indication of the field's length and a path number 'Path_number'. The path number 'Path_number' provides the path management information by indicating the path to which the associated playitem belongs.

Figure 7:
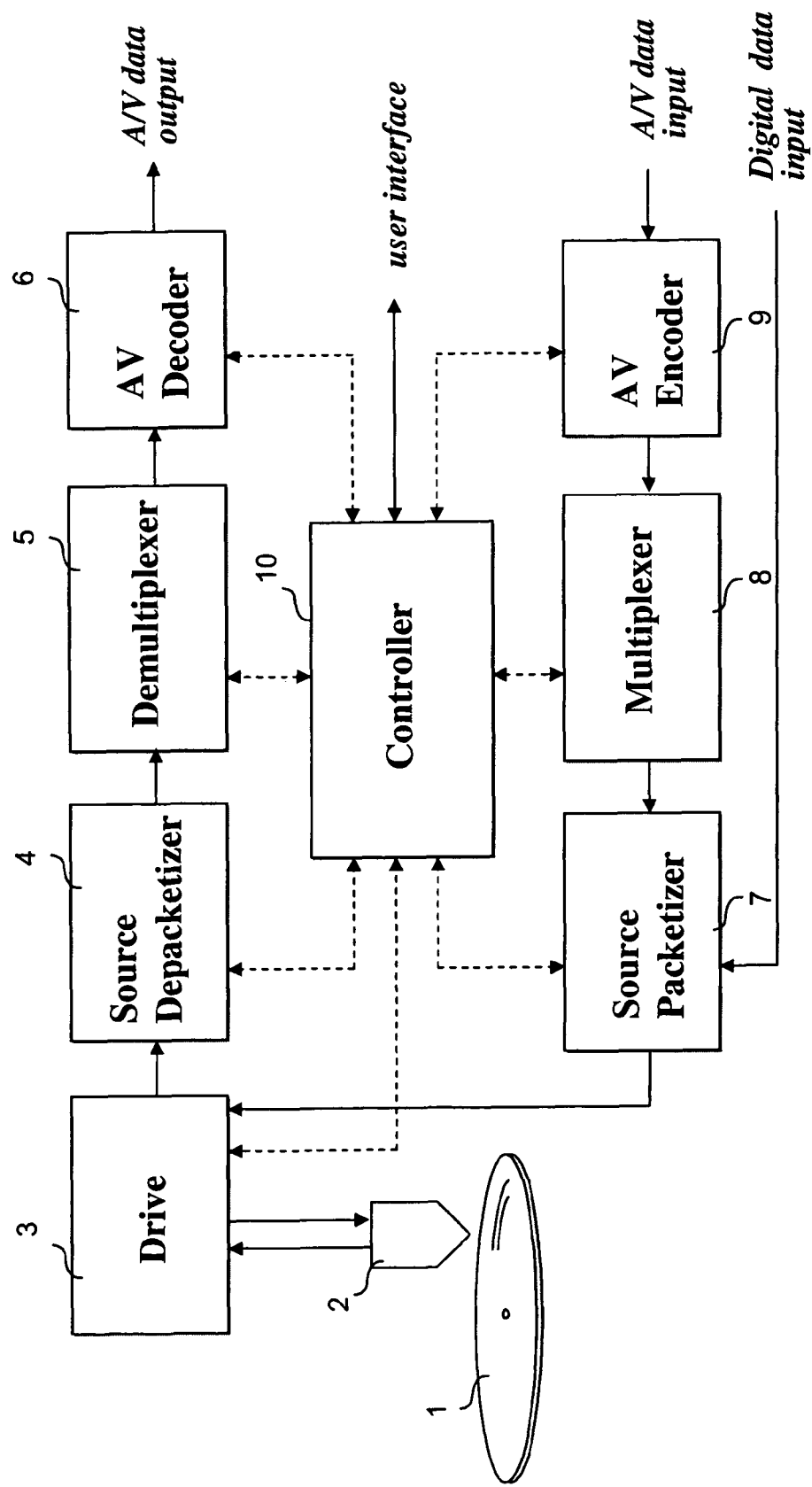
FIG. 7 illustrates a schematic diagram of an embodiment of an optical disk recording and reproduction apparatus of the present invention.

FIG. 7 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. Alternative or additionally, the source packetizer 7 may directly receive digital data. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2, 4 and 5 or 6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management information reproduced from the optical disk, the controller 10 controls the reproduction of the specified path.

For example, to select a particular path, the path numbers for each playlist are examined by the controller 10 to determine the number of reproduction paths, and the user is requested which path to reproduce. The path management information may be augmented to provide more meaningful information regarding the reproduction path to reproduce. During reproduction, the EP map for the selected path is accessed to perform reproduction. And, as discussed above, if the user changes the reproduction path during reproduction, a seamless change takes place by using the EP map of the new reproduction path that is aligned in time with the EP map of the old reproduction path.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was fed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

Figure 8:
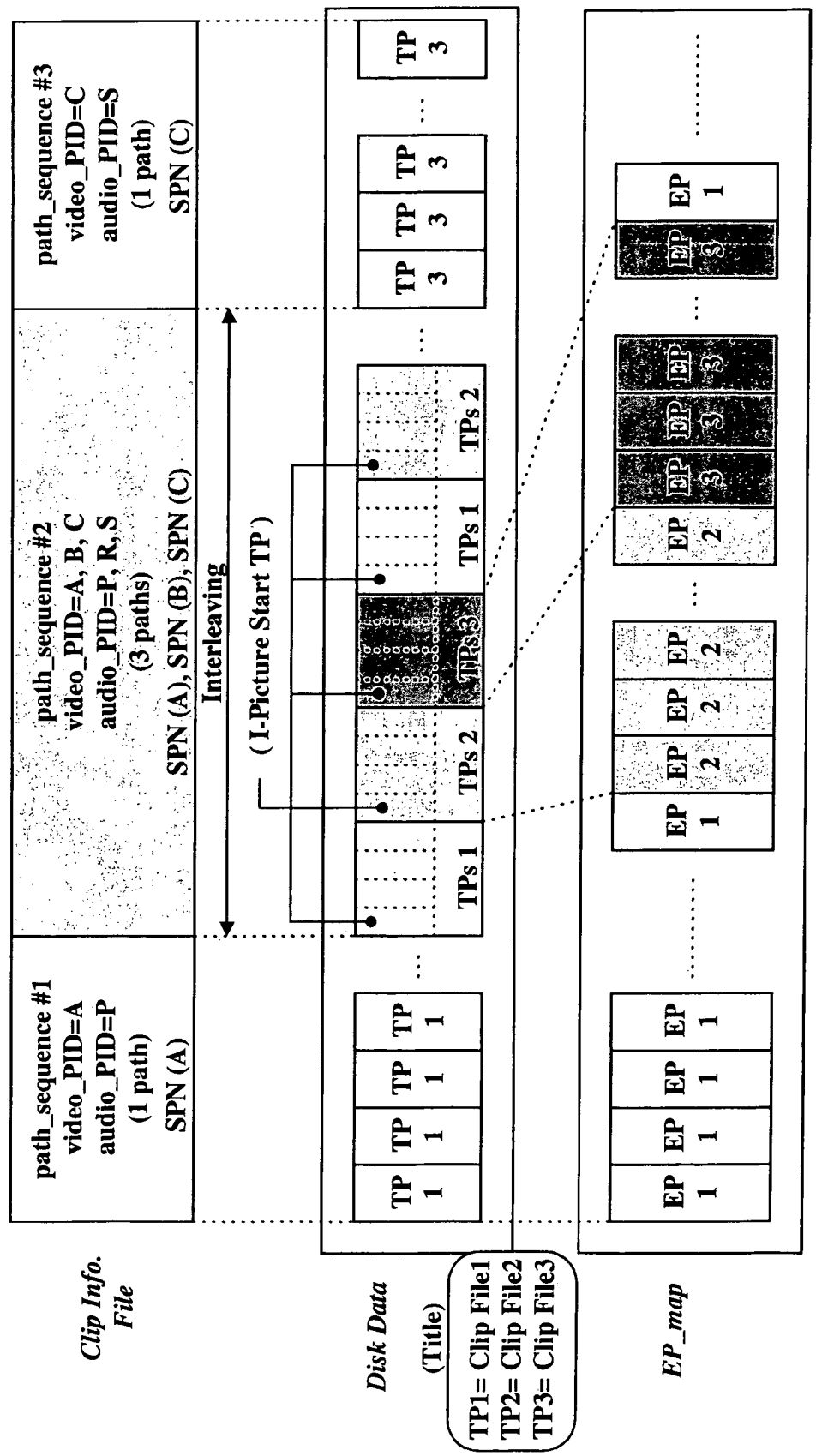
FIG. 8 illustrates a second detailed embodiment of the clip files, disk data and EP map for use in the data structure according to FIG. 2.

FIG. 8 illustrates a second detailed embodiment of the clip files, disk data and EP map for use in the data structure according to FIG. 2. As explained before, a multi-path data stream recorded in a physical data recording area, for example, of the BD-ROM may be managed as a plurality of clip files. For example, clip files 1-3 shown in FIG. 8 correspond to a title and the A/V streams recorded in the clip files are in the form of MPEG2-formatted transport packets (TPs).

The TPs (TP1) of clip file 1 corresponding to Path 1 include the information that Video_PID=A and Audio_PID=P and the TPs (TP2) of clip file 2 corresponding to Path 2 include the information that Video_PID=B and Audio_PID=R. Likewise, the TPs (TP3) of clip file 3 corresponding to Path 3 include the information that Video_PID=C and Audio_PID=S. The TPs of the clip files 1, 2, and 3 corresponding to Paths 1, 2, and 3 respectively are recorded in the AV stream area within the physical data recording area of the recording medium (e.g., BD-ROM) in an interleaved manner. As mentioned before, the different paths may, in one exemplary embodiment be different camera angles.

The TPs for multiple reproduction paths are interleaved as interleave blocks each of which contains at least one I-picture. And the first transport packet of each interleave block is the first transport packet of an I-picture.

The path management information for playback control of the single-path and multi-path A/V streams recorded as a single title in the physical data recording area of the BD-ROM may be recorded in a clip information file corresponding to the clip files, as depicted in FIG. 8.

For example, the path management information is recorded and managed as path sequence information in a clip information file corresponding to the clip files 1, 2, and 3. The path sequence information includes the path sequence numbers (Path_Sequence Numbers) corresponding to the recording segments, for example, recording segments 1, 2, and 3 and video/audio PIDs (Video_PIDs and Audio_PIDs).

In more detail, Path_Sequence #1, corresponding to a first recording segment, includes the information that 'Video_PID=A' and 'Audio_PID=P', which indicates that this recording segment only includes video data for the first reproduction path. Path_Sequence #2, corresponding to the second recording segment, includes the information that 'Video_PID=A,B,C' and 'Audio_PID=P,R,S', which indicates that this segment of video data includes video data for the first, the second, and the third reproduction paths. Path_Sequence #3, corresponding to a third recording segment, includes the information that 'Video_PID=C' and 'Audio_PID=S', which indicates that the video data in this recording segment includes video data for only the third reproduction path.

Each path sequence also includes a source packet number SPN for each reproduction path in the path sequence. The SPN for a reproduction path is the first source packet for that reproduction path in that path sequence.

A path sequence may correspond to video data segment having one or more of the reproduction paths included therein. Also, the number of path sequences is not limited to three.

In addition to the path sequence information, FIG. 8 shows that the clip information files for the clip files 1, 2, and 3, provide the same search information for selectively accessing TPs of each path recorded in the first through third segments. For example, the same EP map is provided by clip information files. When the EP map information recorded in the clip information files is managed as a single EP map, the PTSs and SPNs of TPs of the different reproduction paths are recorded in the EP map by interleaving in the same order that the TPs of the different reproduction paths are recorded.

Alternatively, as shown with respect to FIGS. 4A and 4B, a one-to-one correspondence may exist between EP maps and reproduction paths. In the case of FIG. 8, three EP maps (EP_map 1, 2, 3) corresponding to the groups of TPs of paths 1, 2, 3 respectively would be created and recorded in the clip information file.

As will be readily apparent, the recording and reproducing apparatus of FIG. 7 may operate in the same manner with respect to the embodiment of FIG. 8 as was described above with respect to FIGS. 4A and 4B. However, it will be appreciated that other methods of reproduction are also possible and the present invention is not limited to this one example. For instance, path management information in the form of the path sequence information in the clip information files may be reproduced and used to manage the reproduction of multiple reproduction path video data. Here, the PIDs in each path sequence are examined to determine the number of reproduction paths. The user is then requested to select a path. If a single EP map is provided, the controller 10 uses the EP map and the PID of the selected path to reproduce the appropriate clip file for the selected reproduction path. If an EP map for each reproduction path is provided, then the EP map corresponding to the selected reproduction path is used to reproduce the clip file for the selected reproduction path. And, as discussed above, if the user changes the reproduction path during reproduction, a seamless change takes place by using the EP map of the new reproduction path that is aligned in time with the EP map of the old reproduction path.

Figure 9:
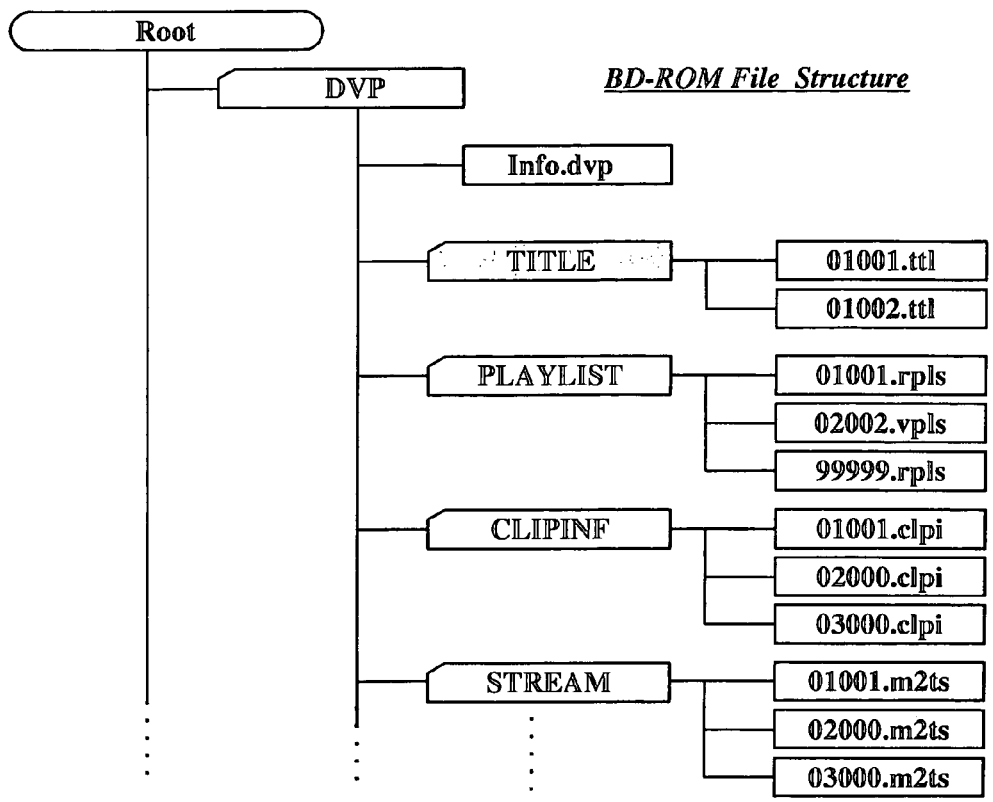
FIG. 9 illustrates another data structure according to an embodiment of the present invention.
Figure 10:
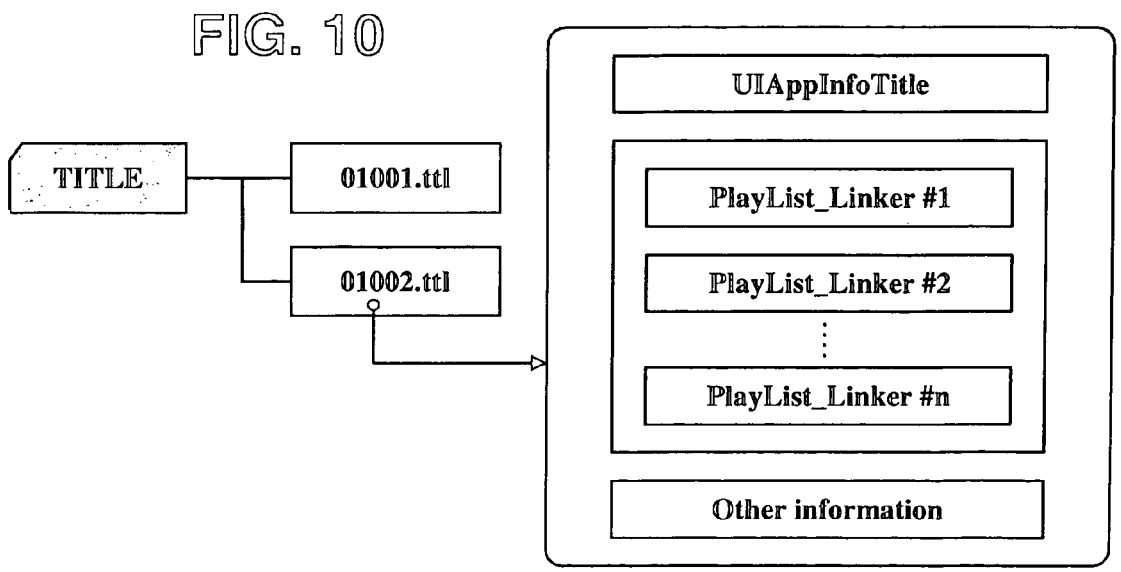
FIG. 10 illustrates an exemplary embodiment of a recording medium having the data structure of FIG. 9 recorded thereon.

FIG. 9 illustrates another data structure according to an embodiment of the present invention. As shown, in this embodiment, the DVP directory includes a TITLE directory. The TITLE directory includes general information files *.ttl for the titles of video data recorded on the recording medium. The general information files *.ttl are the same as the general information file info.dvp discussed above with respect to FIG. 2, except for certain additional information fields discussed in detail below. As further shown in FIG. 9, the DVP directory includes a PLAYLIST directory, CLIPINFO directory and STREAM directory. These directories contain the same information and files as described above with respect to FIG. 2, but do so for all of the titles. As with FIG. 2, FIG. 9 represents areas of the recording medium, and FIG. 10 illustrates an exemplary embodiment of the recording medium including these areas. FIG. 10 is the same as FIG. 3 discussed above, except that the general information file and playlist information area includes a navigation area storing navigation control information as discussed in detail below. While FIG. 10 illustrates one navigation area, it should be understood that more than navigation area may be present.

Figure 11:
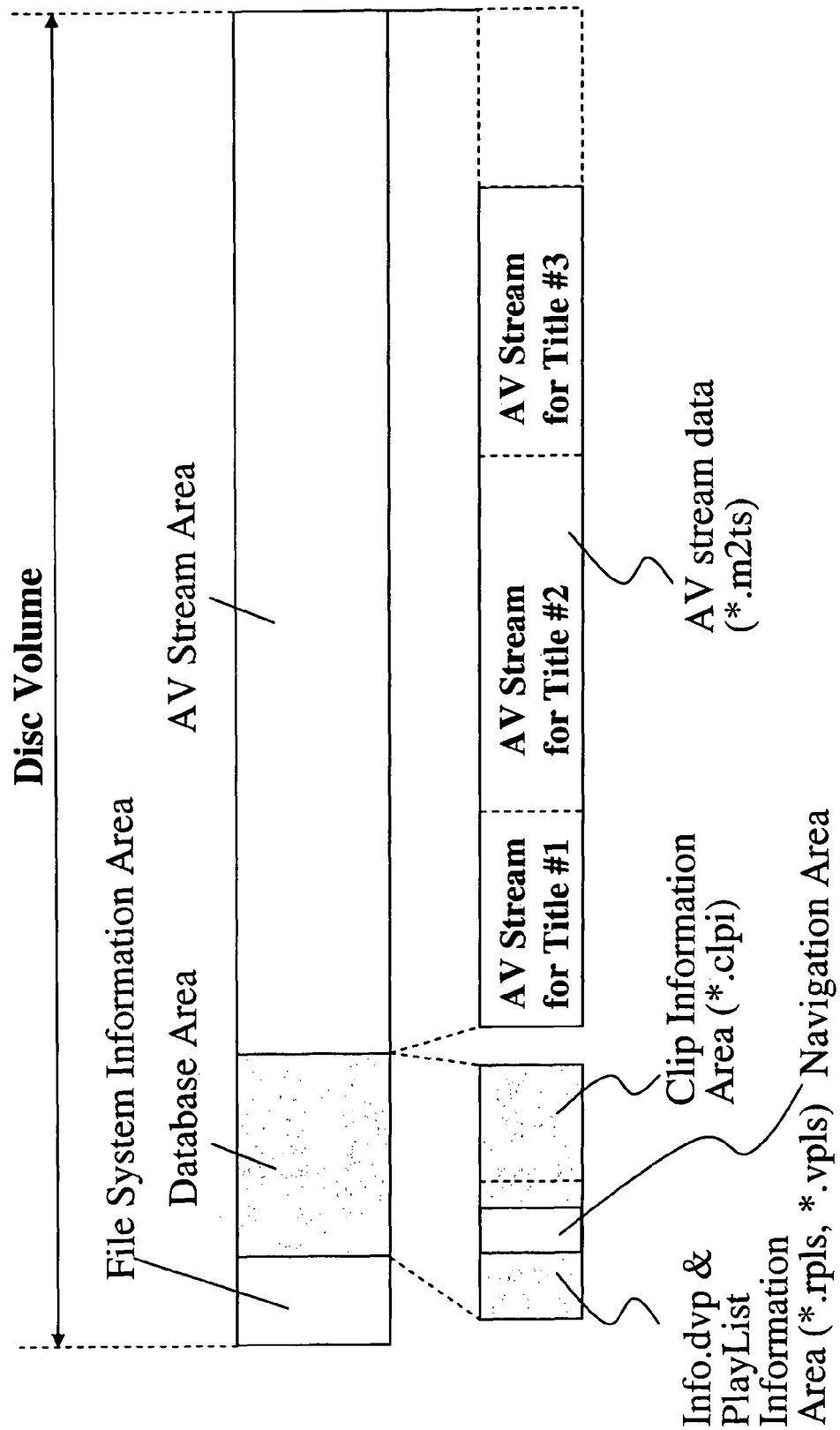
FIG. 11 illustrates a portion of a general information file '*.ttl' for a title according to an embodiment of the present invention in greater detail.

FIG. 11 illustrates a portion of a general information file 'info.ttl' for a title according to an embodiment of the present invention in greater detail. As shown, the general information file '*.ttl' includes one or more navigation files called 'PlayList_Linker'. As will be appreciated, the general information file in the embodiment of FIG. 2 may also include one or more navigation files as will be described in greater detail below.

Figures 12, 14:
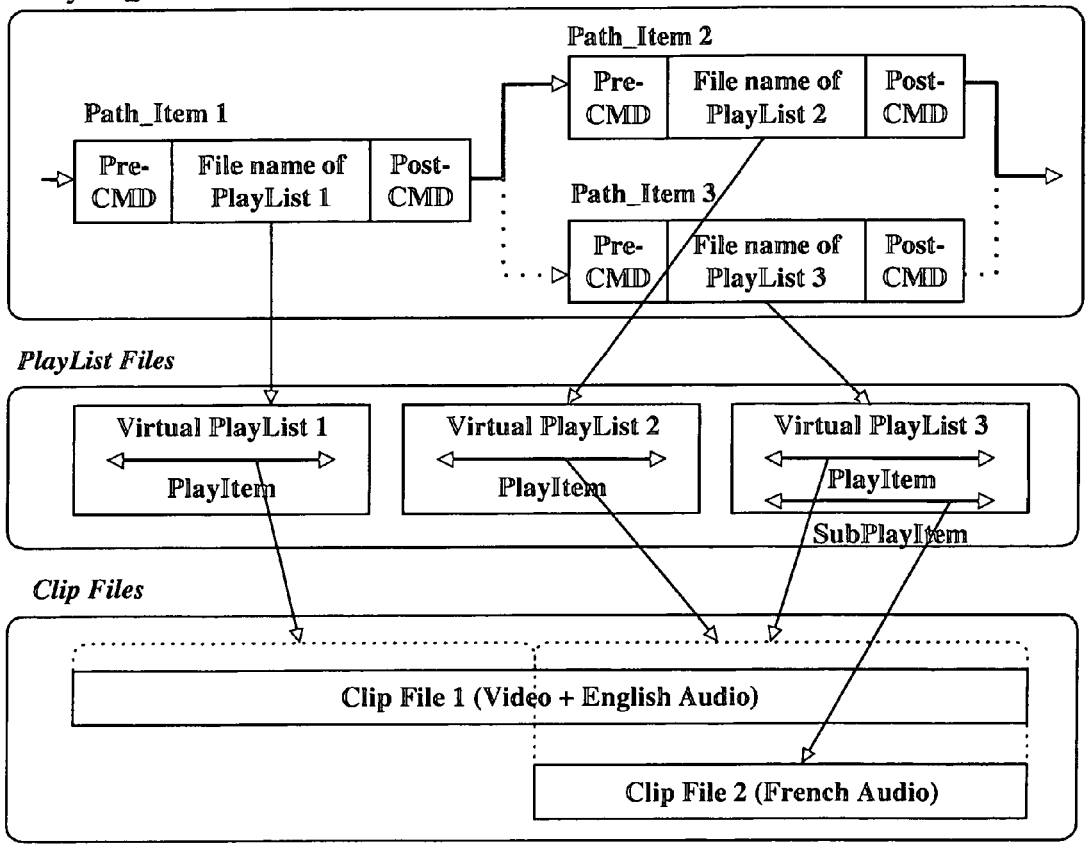
FIG. 12 illustrates an exemplary embodiment of a format for the navigation file 'PlayList_Linker'.
FIGS. 13-17 illustrate graphical representations of different methods of structuring navigation control using the data structure of FIG. 12.

FIG. 12 illustrates an embodiment of the format for the navigation file 'PlayList_Linker'. The navigation file 'PlayList_Linker' includes a length field indicating the length of the navigation file, a path type field 'Path_type' indicating at least one attribute of the navigation file (e.g., the path type information may indicate the type of multiple reproduction path data stream managed by the navigation file), and a number of playlists field 'Number_of_PlayLists' indicating a number of playlists. For each playlist, the navigation file 'PlayList_Linker' provides one or more pre-navigation commands 'Pre_Command', a playlist file name 'PlayList_file_name', and one or more post-navigation commands 'Post-Command'. The pre-navigation command, playlist file name and post-navigation command set provided for each playlist forms a navigation command group referred to as a path item. In other words, the number of playlists field 'Number_of_PlayLists' indicates the number of navigation command groups or path items in the navigation file.

The playlist file name indicates the file name 'PlayList_file_name' of a playlist for possible playback. The 'Pre-Command' provides one or more navigation commands to control the associated path item (e.g., whether to reproduce the identified playlist). The 'Post-Command' provides one or more post-navigation commands to control navigation of the playback path. For example, the post-navigation commands may include a program (e.g., Boolean logic) for controlling to which path item the reproduction path should branch. The branching decisions may, in some instances, be based on user input provided as part of the reproduction process. Branching and other navigation of path items will be described in greater detail below.

FIGS. 13-17 illustrate graphical representations of different methods of structuring navigation control using the data structure of FIG. 12. As explained before, a multiple reproduction path data stream recorded in the AV stream area of, for example, a BD-ROM may be managed as a plurality of clip files. The plurality of clip files are associated with a plurality of playlist files, which may be allocated to different reproduction paths.

Figure 13:
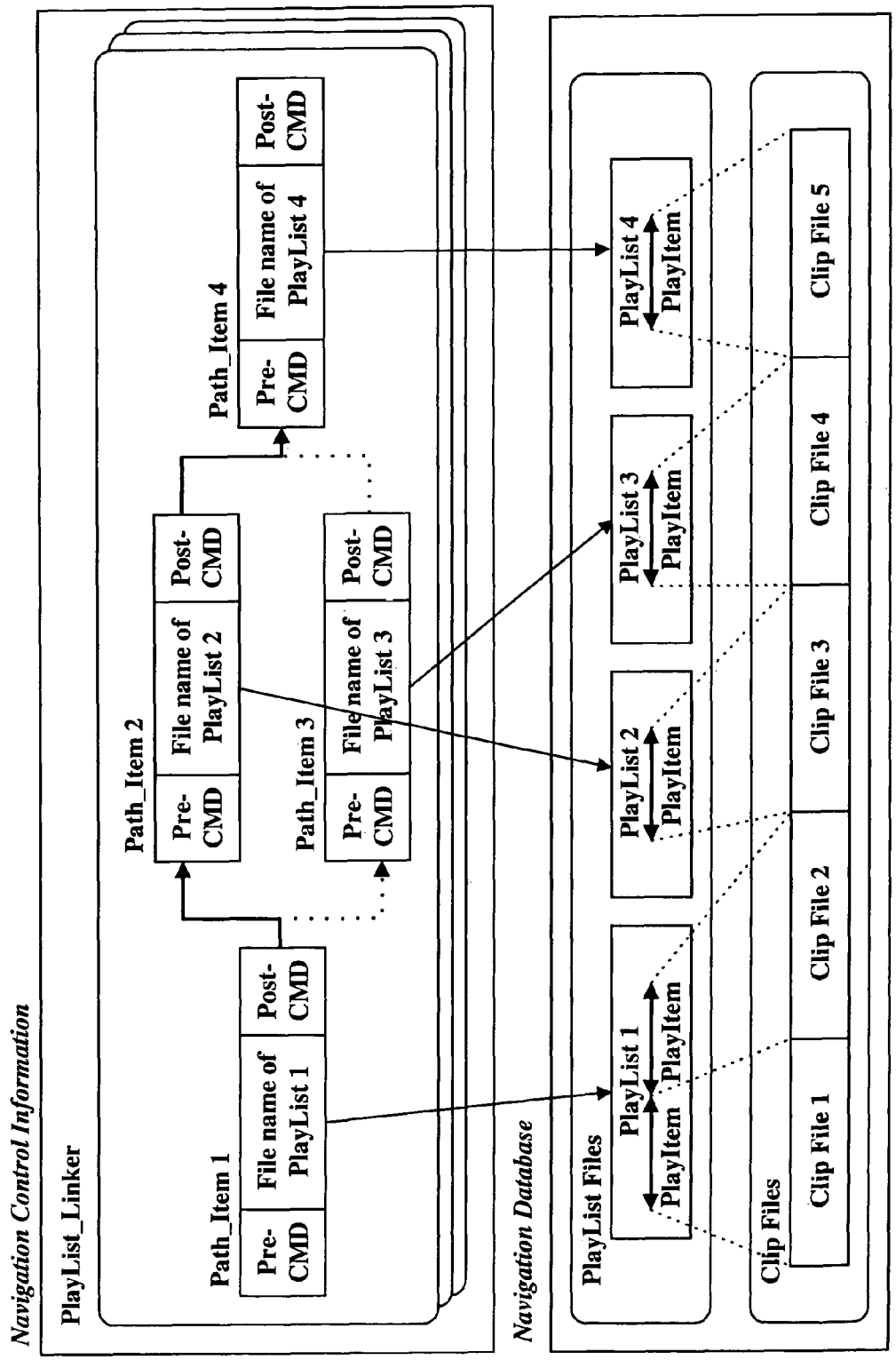

In the example of FIG. 13, the A/V stream is recorded as first-fifth clip files 'Clip File 1' to 'Clip File 5'. The third and fourth clip files 'Clip File 3' and 'Clip File 4' are associated with different reproduction paths, while the first, second and fifth clip files 'Clip File 1', 'Clip File 2' and 'Clip File 5' are common to each of the reproduction paths. As further shown, the first and second clip files 'Clip File 1' and 'Clip File 2' are referenced by respective playitems in a first playlist 'PlayList 1'. The third clip file 'Clip File 3' is referenced by a playitem in a second playlist 'Playlist 2', the fourth clip file 'Clip File 4' is referenced by a playitem in a third playlist 'Playlist 3', and the fifth clip file 'Clip File 5' is referenced by a playitem in a fourth playlist 'Playlist 4'.

As shown in FIG. 13, the data structure of the clip files and playlists is referred to as the navigation database. Namely, this provides the raw material (e.g., video data, etc.), that may be managed. The management of the navigation database is referred to as the navigation control information; namely, the navigation files discussed in detail above. FIG. 13 graphically illustrates the navigation control information provided by one exemplary navigation file 'PlayList_Linker'.

The navigation file 'PlayList_Linker' begins with a first path item (i.e., a first navigation command group), which includes pre-navigation commands and a playlist file name instructing playback of the first playlist 'PlayList 1'. The post-navigation commands of the first path item provide for branching to either a second or third navigation command group (i.e., a second or third path item). Here, the second path item includes pre-navigation commands and a playlist file name instructing playback of the second playlist 'PlayList 2', and the third path item includes pre-navigation commands and a playlist file name instructing playback of the third playlist 'PlayList 3'. Accordingly, the post-navigation commands of the first path item selectively control playback of the second playlist 'PlayList 2' or the third playlist 'PlayList 3'.

As discussed above, the second and third playlists instruct reproduction of the third and fourth clip files 'Clip File 3' and 'Clip File 4', which are associated with different reproduction paths. As such, the post-navigation commands for the first path item control which reproduction path is reproduced. Whether reproduction branches to the path represented by the second path item or the path represented by the third path item may depend on user input. For example, prior to starting reproduction or during reproduction, a user may enter a desired reproduction path. The logic represented by the post-navigation commands then causes reproduction to branch to the correct path item based on the user's selection. If no selection is made, then a default selection may be used. Specific examples of reproduction path selections and navigation based on those selections are described in detail below with respect to the embodiments of FIGS. 14-17.

Both the second and third path items include post-navigation commands instructing that the reproduction path proceed to the fourth path item. The fourth path item includes pre-navigation commands and a playlist file name instructing playback of the fourth playlist 'PlayList 4'.

FIG. 14 illustrates a graphical representation of an exemplary embodiment for structuring navigation control using the data structure of FIG. 12 when the multiple reproduction paths include different languages. As shown, the A/V stream is recorded as first and second clip files 'Clip File 1' and 'Clip File 2'. The first clip file 'Clip File 1' includes video data and English language audio data associated with the video data. The second clip file 'Clip File 2' includes French audio data. It will be appreciated that second clip file 'Clip File 2' may include video data and French language audio data associated with the video data. Furthermore, it will be appreciated that the present invention is not limited to these languages or to having only two language options.

As further shown, the first and second clip files 'Clip File 1' and 'Clip File 2' are referenced by respective playitems in a first, second and third virtual playlists 'PlayList 1', 'PlayList 2' and 'PlayList 3.' It will be appreciated that the present invention is not limited to using virtual playlists to refer to the clip files, instead real playlist may be used. The first playlist 'PlayList 1' references a first portion of the first clip file 'Clip File 1', and the second playlist 'Playlist 2' references a second portion of the first clip file 'Clip File 1'. The third playlist 'Playlist 3' includes a playitem referencing the second portion of the first clip file 'Clip File 1' and a subplayitem referencing the second clip file 'Clip File 2'.

As shown in FIG. 14, the navigation file 'PlayList_Linker' begins with a first path item (i.e., a first navigation command group), which includes pre-navigation commands and a playlist file name instructing playback of the first playlist 'PlayList 1'. The post-navigation commands of the first path item provide for branching to either a second or third navigation command group (i.e., a second or third path item). Here, the second path item includes pre-navigation commands and a playlist file name instructing playback of the second playlist 'PlayList 2'. The third path item includes pre-navigation commands and a playlist file name instructing playback of the third playlist 'PlayList 3'. The third playlist 'PlayList 3' instructs playback of the video data associated with the second portion of the first clip file 'Clip File 1' and audio data associated with either the first clip file 'Clip File 1' or the second clip file 'Clip File 2'. For example, if a user selects English language reproduction, the audio data of the first clip file 'Clip File 1' is reproduced and if a user selects French language reproduction, the audio data of the second clip file 'Clip File 2' is reproduced. Whether reproduction branches to the path represented by the second path item or the path represented by the third path item may also depend on user input. For example, prior to starting reproduction or during reproduction, a user may enter a desired language for reproduction. The logic represented by the post-navigation commands in the first playitem then causes reproduction to branch to the correct language path item based on the user's selection. If no selection is made, then a default selection (e.g., English language) may be used. As such, the post-navigation command for the first path item helps control which language is reproduced.

Both the second and third path items include post-navigation commands instructing that the reproduction path proceed to the same path item (not shown).

Figure 15:
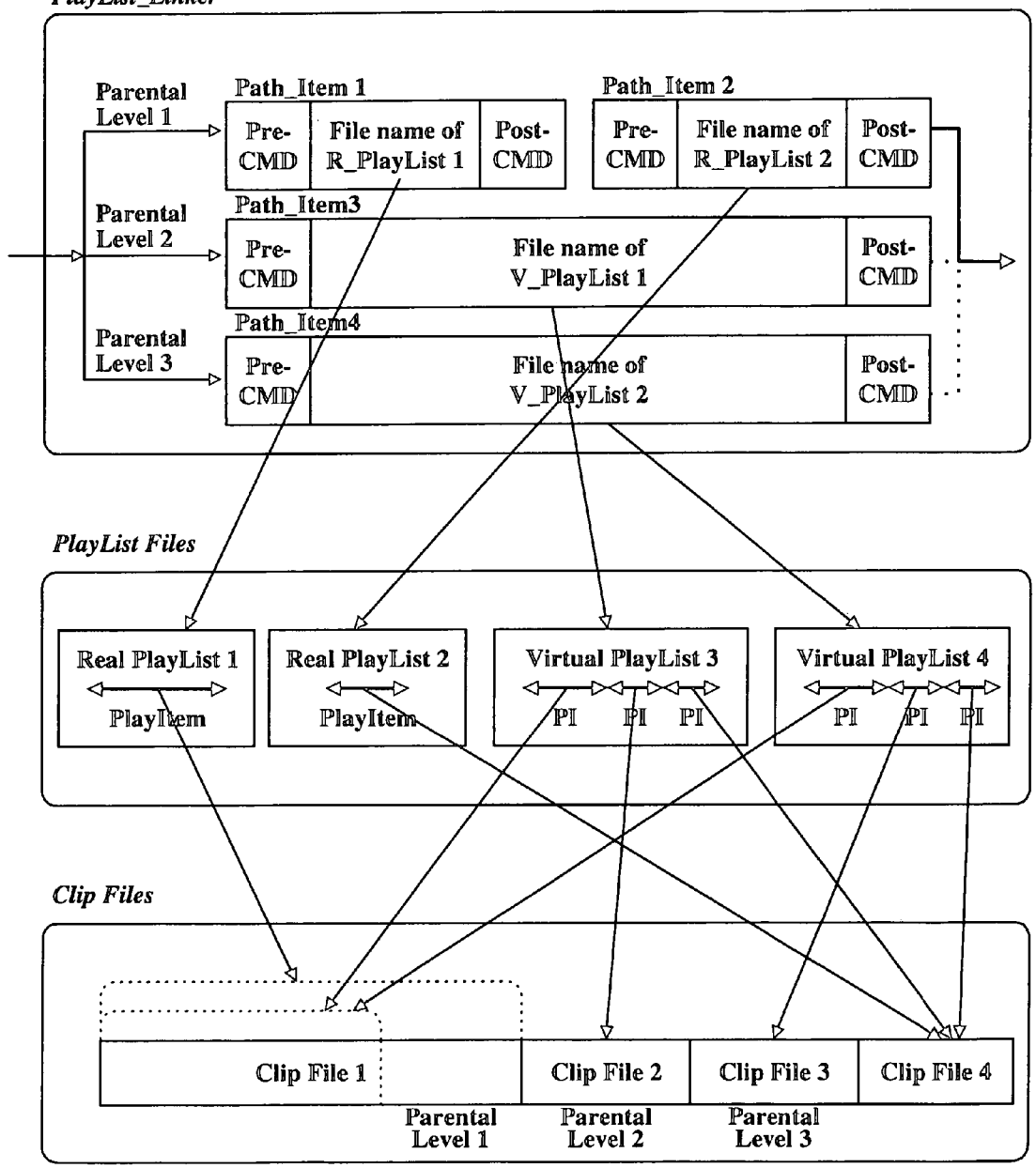

FIG. 15 illustrates a graphical representation of an exemplary embodiment for structuring navigation control using the data structure of FIG. 12 when the multiple reproduction paths include different parental control levels. As discussed above, an adult version, young adult version and young child version (i.e., different parental control versions) of a title or portions of a title may be recorded on the recording medium.

As shown in FIG. 15, the A/V stream is recorded as first through fourth clip files 'Clip File 1' to 'Clip File 4'. The video data, audio, and/or etc. of the as first through fourth clip files 'Clip File 1' to 'Clip File 4' satisfies one or more levels of parental control. For the purposes of example only, FIG. 15 represents the situation where three levels of parental control are available. A first level of parental control 'Parental Level 1' represents a lowest level of parental control. This means the fewest or no restrictions on reproduction of the A/V stream. This level of parental control may be set, for example, when the user desires reproduction of an adult version of, for example, a title. The second level of parental control 'Parental Level 2' represents a higher level of parental control. This means some restrictions are placed on the reproduction of the A/V stream. For example, the second level of parental control 'Parental Level 2' may represent a young adult version of a title in which certain portions of the A/V stream unsuitable for young adults are not reproduced. A third level of parental control 'Parental Level 3' represents a highest level of parental control. This means even greater restrictions may be placed on the reproduction of the A/V stream. For example, the third level of parental control 'Parental Level 3' may represent a child's version of a title in which certain portions of the A/V stream unsuitable for children are not reproduced.

As will be explained in greater detail below, the clip files may be organized such that they are associated in their entirety with one or more parental levels or may be organized such that different portions are associated with different parental levels. In addition, clip files or portions of a clip file may represent alternative portions of a title depending on the parental control level. As will be further appreciated, portions of a clip file or a clip file associated with the third (highest) parental control level 'Parental Level 3' may also be associated with the first and second parental control levels 'Parental Level 1' and 'Parental Level 2'. Namely, if A/V steam data satisfies a given parental control level, it also satisfies the parental control levels lower than the given parental control level, and may be reproduced as part of that lower level parent control reproduction path.

As shown in FIG. 15, a first portion of the first clip file 'Clip File 1' and the entire fourth clip file 'Clip File 4' satisfy any parental control level. A second portion of the first clip file 'Clip File 1' satisfies the first parental control level 'Parental Level 1'. The second clip file 'Clip File 2' satisfies the second parental control level 'Parental Level 2', and the third clip file 'Clip File 3' satisfies the third parental control level 'Parental Level 3'. In this example, the second portion of the first clip file 'Clip File 1', the second clip file 'Clip File 2' and the third clip file 'Clip File 3' represent alternatives of a same portion of a title that are reproduced depending on the chosen parental control path.

As further shown in FIG. 15, a first playlist 'PlayList 1' includes a single playitem referencing the first clip file 'Clip File 1'. A second playlist 'PlayList 2' includes a single playitem referencing the fourth clip file 'Clip File 4'. A third playlist 'PlayList 3' includes a first playitem referencing the first portion of the first clip file 'Clip File 1', a second playitem referencing the second clip file 'Clip File 2' and a third playitem referencing the fourth clip file 'Clip File 4'. The fourth playlist 'Playlist 4' includes a first playitem referencing the first portion of the first clip file 'Clip File 1', a second playitem referencing the third clip file 'Clip File 3' and a third playitem referencing the fourth clip file 'Clip File 4'. Because the playlists may be either real or virtual, both types have been commonly referred to as playlists in the above-description.

The navigation file 'PlayList_Linker' provides for three different reproduction paths, each associated with one of the three parental control levels. As shown, a first path item (i.e., a first navigation command group), includes pre-navigation commands and a playlist file name instructing playback of the first playlist 'PlayList 1' if the first parental control level 'Parental Level 1' has been selected by a user for reproduction. The post-navigation commands of the first path item provide for proceeding to a second navigation command group (i.e., a second path item). Here, the second path item includes pre-navigation commands and a playlist file name instructing playback of the second playlist 'PlayList 2'. If the second or third parental control levels 'Parent Level 2' or 'Parental Level 3' have been selected, the pre-navigation commands of the first path item prevent the first path item from being acted upon by the reproducing apparatus; and thus, prevent the first playlist 'PlayList 1' from being reproduced and prevent proceeding to the second path item.

A third path item includes pre-navigation commands and a playlist file name instructing playback of the third playlist 'PlayList 3' if the second parental control level 'Parental Level 2' has been selected by a user for reproduction. If the first or third parental control levels 'Parent Level 1' or 'Parental Level 3' have been selected, the pre-navigation commands of the third path item prevent the third path item from being acted upon by the reproducing apparatus; and thus, prevent the third playlist 'PlayList 3' from being reproduced.

A fourth path item includes pre-navigation commands and a playlist file name instructing playback of the fourth playlist 'PlayList 4' if the third parental control level 'Parental Level 3' has been selected by a user for reproduction. If the first or second parental control levels 'Parent Level 1' or 'Parental Level 2' have been selected, the pre-navigation commands of the fourth path item prevent the fourth path item from being acted upon by the reproducing apparatus; and thus, prevent the fourth playlist 'PlayList 4' from being reproduced.

Figure 16:
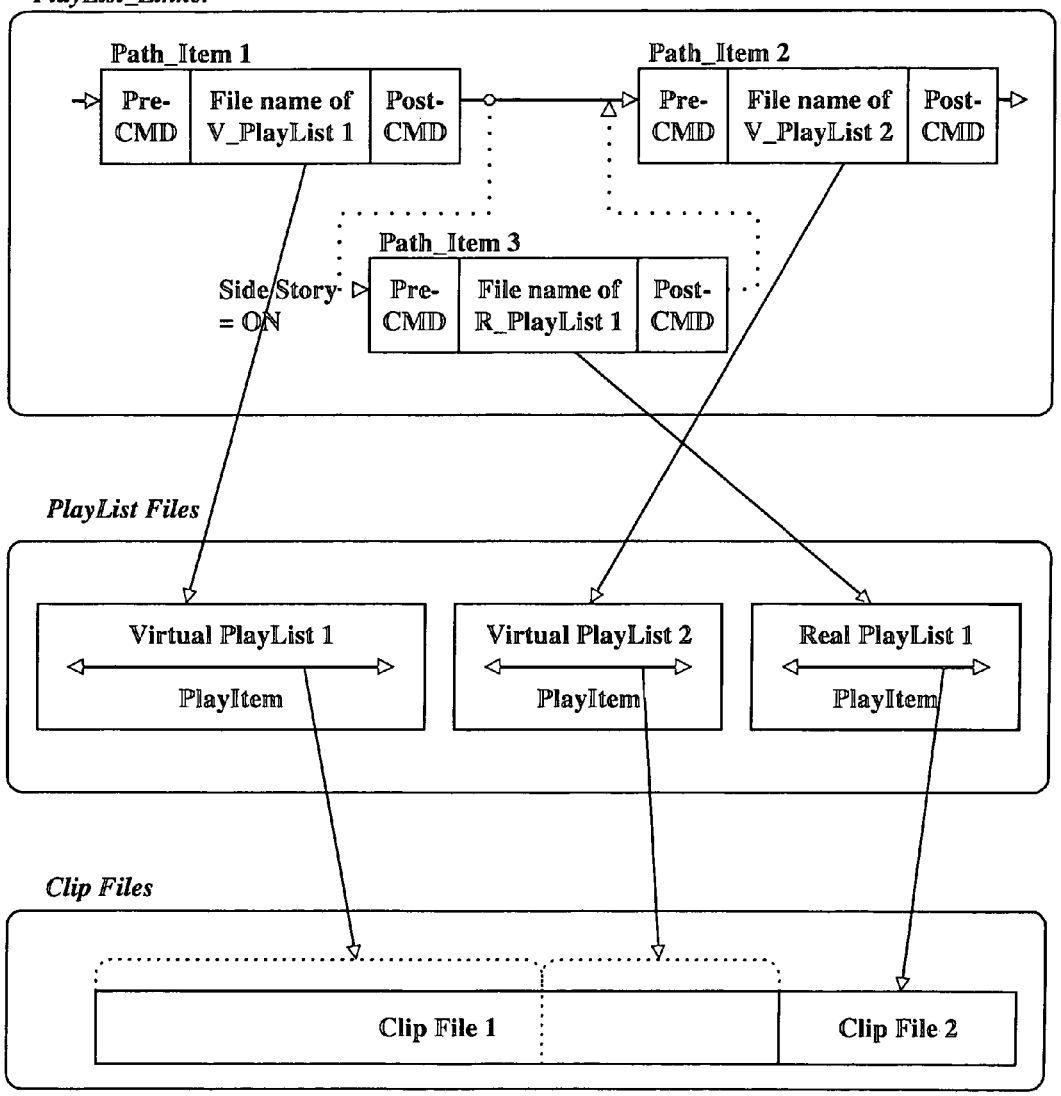

FIG. 16 illustrates a graphical representation of an exemplary embodiment for structuring navigation control using the data structure of FIG. 12 when a main reproduction path includes a side path. For example, a main story or title, may have a side story (e.g., director's commentary) associated with a portion of the main story. At the portion of the main story with which the side story is associated, a user may be presented with the option to have the side story reproduced. If the user provides input assenting to reproduction of the side story, the side story is reproduced and then reproduction may continue with the main story.

As shown in FIG. 16, the A/V stream is recorded as first and second clip files 'Clip File 1' and 'Clip File 2'. The first clip file 'Clip File 1' includes A/V stream data associated with a main reproduction path (e.g., a main story). The second clip file 'Clip File 2' includes A/V stream data associated with a side reproduction path (e.g., a side story). It will be appreciated, that the main reproduction path is not limited to having a single side reproduction path; nor is the side reproduction path limited to being a side story.

As further shown, the first and second clip files 'Clip File 1' and 'Clip File 2' are referenced by respective playitems in a first, second and third virtual playlist 'PlayList 1', 'PlayList 2' and 'PlayList 3.' It will be appreciated that the present invention is not limited to using virtual playlists to refer to the clip files, instead real playlist may be used. The first playlist 'PlayList 1' references a first portion of the first clip file 'Clip File 1', and the second playlist 'PlayList 2' references a second portion of the first clip file 'Clip File 1'. The third playlist 'Playlist 3' includes a playitem referencing the second clip file 'Clip File 2'.

As shown in FIG. 16, the navigation file 'PlayList_Linker' begins with a first path item (i.e., a first navigation command group), which includes pre-navigation commands and a playlist file name instructing playback of the first playlist 'PlayList 1'. The post-navigation commands of the first path item provide for branching to either a second or third navigation command group (i.e., a second or third path item). Here, the second path item includes pre-navigation commands and a playlist file name instructing playback of the second playlist 'PlayList 2'. The third path item includes pre-navigation commands and a playlist file name instructing playback of the third playlist 'PlayList 3'. The post-navigation commands of the third path item provide for proceeding to the second path item.

Prior to reproduction a user may specify whether side reproduction paths are to be reproduced. Alternatively or additionally, during reproduction, the main A/V stream may notify the user as part of the reproduction of the main A/V stream that a side reproduction path is available for reproduction with respect to the currently reproduced portion of the main A/V stream. In response, the user may assent to reproduction of the side reproduction path. For example, if according to one of the above-described methods, a user selects reproduction of the side story in the example of FIG. 16, the first path item branches to the third path item. Otherwise, the first path item branches to the second path item.

Figure 17:
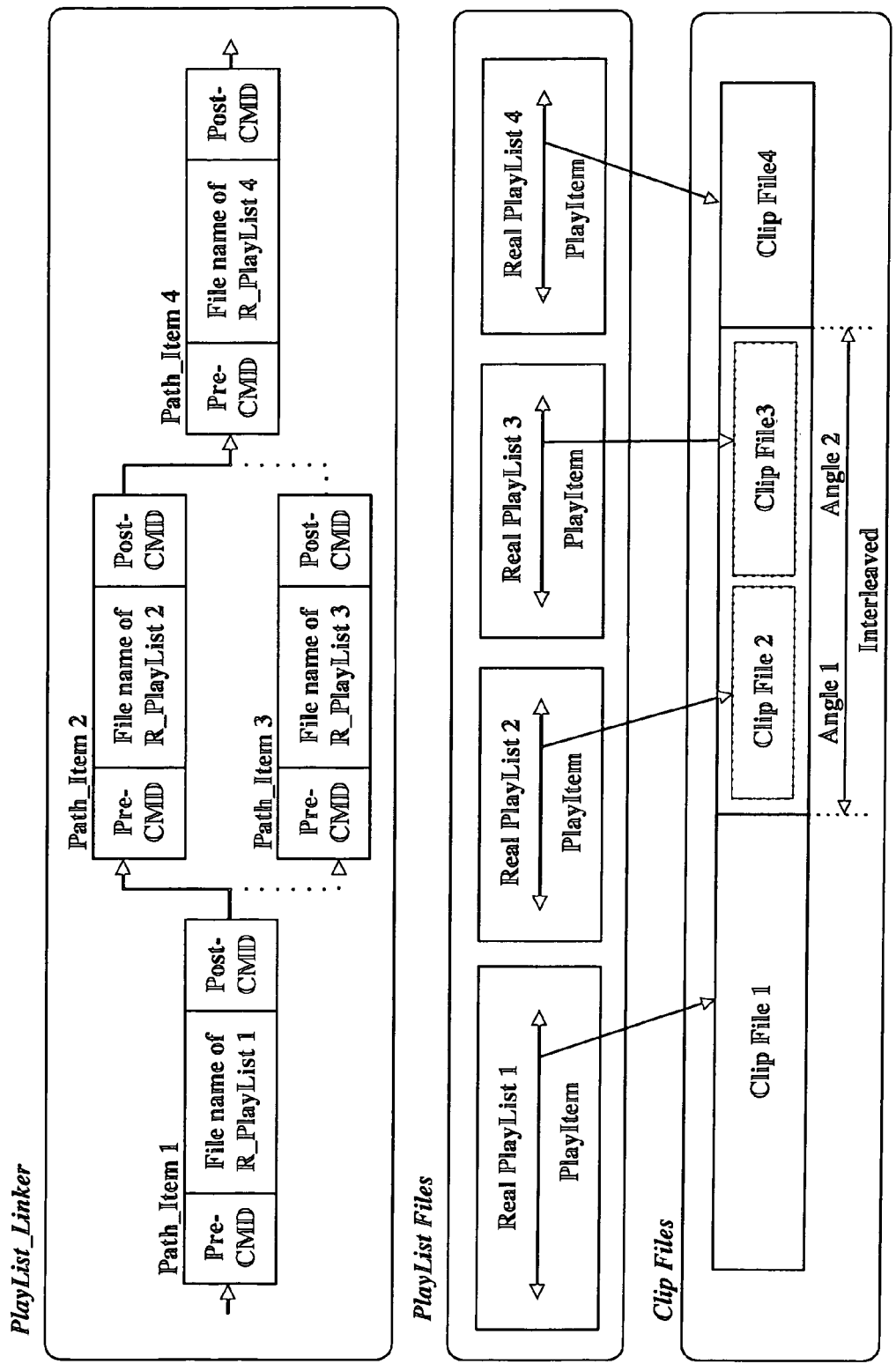

FIG. 17 illustrates a graphical representation of an exemplary embodiment for structuring navigation control using the data structure of FIG. 12 when the multiple reproduction paths include different camera angles. As shown, the A/V stream is recorded as first through fourth clip files 'Clip File 1' to 'Clip File 4'. Of the first through fourth clip files 'Clip File 1' to 'Clip File 4', the second and third clip files 'Clip File 2' and 'Clip File 3' represent different camera angles of the same portion of, for example, a title. Furthermore, the A/V stream data for the second and third clip files may be interleaved as shown in FIG. 17. Accordingly, during reproduction, one of the two camera angles may be selectively reproduced. It will be appreciated that more than two camera angles may be provided, and that more than one portion of the A/V stream may provide for selecting between multiple camera angles.

As further shown in FIG. 17, the first through fourth clip files 'Clip File 1' to 'Clip File 4' are respectively referenced by playitems in first through fourth playlists 'PlayList 1' to 'PlayList 4.'

The navigation file 'PlayList_Linker' begins with a first path item (i.e., a first navigation command group), which includes pre-navigation commands and a playlist file name instructing playback of the first playlist 'PlayList 1'. The post-navigation commands of the first path item provide for branching to either a second or third navigation command group (i.e., a second or third path item). Here, the second path item includes pre-navigation commands and a playlist file name instructing playback of the second playlist 'PlayList 2'. The third path item includes pre-navigation commands and a playlist file name instructing playback of the third playlist 'PlayList 3'. For example, if a user selects a first camera angle for reproduction, reproduction branches to the second playlist 'PlayList 2' and the second clip file 'Clip File 2' is reproduced. If a user selects a second camera angle for reproduction, reproduction branches to the third playlist 'PlayList 3' and the third clip file 'Clip File 3' is reproduced. For example, prior to starting reproduction or during reproduction, a user may enter a desired camera angle for reproduction. The logic represented by the post-navigation commands in the first path item then causes reproduction to branch to the correct camera angle path item based on the user's selection. If no selection is made, then a default selection (e.g., camera angle 1) may be used. As such, the post-navigation command for the first path item helps control which camera angle is reproduced.

Both the second and third path items include post-navigation commands instructing that the reproduction path proceed to the fourth path item. The fourth path item includes pre-navigation commands and a playlist file name instructing playback of the fourth playlist 'PlayList 4'.

The recording and reproducing apparatus described with respect to FIG. 7 is also applicable to recording and reproducing the embodiments of the recording medium having data structures as described above with respect to FIGS. 9-17. As will be appreciated, the recording and reproducing apparatus of FIG. 7 operates in the same manner as was described above in recording the data structures of FIGS. 9-17 on the recording medium (e.g., BD-ROM). Reproduction by the recording and reproducing apparatus of FIG. 7 is also substantially the same, except that the playlist linkers are reproduced, and the navigation management information provided thereby is used to control reproduction of the A/V stream data as described above with respect to the embodiments of FIGS. 13-17.

The embodiments of FIGS. 11-17 of the present invention have been described as applied to the data structure of FIG. 9;

however, it will be appreciated that these embodiments are also applicable to the data structure of FIG. 2.

Furthermore, it will be appreciated, that the different reproduction path embodiments may be combined in generating possible reproduction paths.

As will be appreciated from the forgoing disclosure, the present invention provides a recording medium having a file or data structure that permits managing and/or controlling navigation of the reproduction of A/V stream data. Accordingly, the present invention provides a greater level of flexibility in the reproduction of video data than previously available.

As will be further appreciated, the present invention provides methods and apparatuses for recording and reproducing the data structure for managing and/or controlling navigation of the reproduction of A/V stream data.

While the invention has been disclosed with respect to a limited number of embodiments, those skilled in the art, having the benefit of this disclosure, will appreciate numerous modifications and variations therefrom. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disk comprising:
   first and stream files, the first stream file including first video data corresponding to a first reproduction path, the second stream file including second video data corresponding to a second reproduction path;
   first and second clip information files, the first clip information file including a first entry point map mapping presentation time stamps to source packet addresses of the first video data, the second clip information file including a second entry point map mapping presentation time stamps to source packet addresses of the second video data;
   first and second playlist files, the first playlist file including at least one playitem identifying a pair of in-point and out-point pointing to the presentation time stamps in a clip of the first video data, the second playlist file including at least one playitem identifying a pair of in-point and out-point pointing to the presentation time stamps in a clip of the second video data; and
   at least one navigation file including first and second path items, the first path item including a first navigation command for launching the first playlist file, the second path item including a second navigation command for launching the second playlist file,
   wherein the first and second stream files, the first and second clip information files, the first and second playlist files and the navigation file are separate files from each other.

2. The optical disk of claim 1, wherein the first path item further includes a length field indicating a length of the first path item, and the second path item further includes a length field indicating a length of the second path item.

3. The optical disk of claim 1, wherein the first path item further includes an attribute field indicating at least one attribute of the first path item, and the second path item further includes an attribute field indicating at least one attribute of the second path item.

4. The optical disk of claim 1, wherein the navigation file further includes a field indicating the number of path items in the navigation file.

5. A method of recording a data structure for managing reproduction of video data on an optical disk, the method comprising:
   recording first and second stream files on the optical disk, the first stream file including first video data corresponding to a first reproduction path, the second stream file including second video data corresponding to a second reproduction path;
   recording first and second clip information files on the optical disk, the first clip information file including a first entry point map mapping presentation time stamps to source packet addresses of the first video data, the second clip information file including a second entry point map mapping presentation time stamps to source packet addresses of the second video data;
   recording first and second playlist files on the optical disk, the first playlist file including at least one playitem identifying a pair of in-point and out-point pointing to the presentation time stamps in a clip of the first video data, the second playlist file including at least one playitem identifying a pair of in-point and out-point pointing to the presentation times stamps in a clip of the second video data; and
   recording at least one navigation file including first and second path items on the optical disk, the first path item including a first navigation command for launching the first playlist file, the second path item including a second navigation command for launching the second playlist file,
   wherein the first and second stream files, the first and second clip information files, the first and second playlist files and the navigation file are separate files from each other.

6. A method of reproducing data recorded on an optical disk, the method comprising:
   reading at least one navigation file including first and second path items recorded on the optical disk, the first path item including a first navigation command for launching a first playlist file, the second path item including a second navigation command for launching a second playlist file;
   reading the first playlist file recorded on the optical disk, the first playlist file including at least one playitem identifying a pair of in-point and out-point pointing to presentation time stamps in a clip of first video data corresponding to a first reproduction path;
   reading a first clip information file including a first entry point map mapping the presentation time stamps to source packet addresses of the first video data; and
   reproducing the first video data included in a first stream file recorded on the optical disk;
   reading the second playlist file recorded on the optical disk, the second playlist file including at least one playitem identifying a pair of in-point and out-point pointing to presentation time stamps in a clip of second video data corresponding to a second reproduction path;
   reading a second clip information file including a second entry point map mapping the presentation time stamps to source packet addresses of the second video data; and
   reproducing the second video data included in a second stream file recorded on the optical disk,
   wherein the first and second stream files, the first and second clip information files, the first and second playlist files and the navigation file are separate files from each other.

7. An apparatus for recording data on an optical disk, the apparatus comprising:
   a pickup configured to record data on the optical disk; and
   a controller configured to control the pickup to
   record first and second stream files, the first stream file including first video data corresponding to a first reproduction path, the second stream file including second video data corresponding to a second reproduction path;
   record first and second clip information files on the optical disk, the first clip information file including a first entry point map mapping presentation time stamps to source packet addresses of the first video data, the second clip information file including a second entry point map mapping presentation time stamps to source packet addresses of the second video data;
   record first and second playlist files on the optical disk, the first playlist file including at least one playitem identifying a pair of in-point and out-point pointing to the presentation time stamps in a clip of the first video data, the second playlist file including at least one playitem identifying a pair of in-point and out-point pointing the presentation time stamps in a clip of the second video data, and
   record at least one navigation file including first and second path items on the optical disk, the first path item including a first navigation command for launching the first playlist file, the second path item including a second navigation command for launching the second playlist file,
   wherein the first and second stream files, the first and second clip information files, the first and second playlist files and the navigation file are separate files from each other.

8. An apparatus for reproducing data recorded on an optical disk, the apparatus comprising:
   a pickup configured to reproduce data recorded on the optical disk;
   a controller configured to control the pickup to
   read at least one navigation file including first and second path items recorded on the optical disk, the first path item including a first navigation command for launching a first playlist file, the second path item including a second navigation command for launching a second playlist file,
   read the first playlist file recorded on the optical disk, the first playlist file including at least one playitem identifying a pair of in-point and out-point pointing to presentation time stamps in a clip of first video data corresponding to a first reproduction path,
   read a first clip information file including a first entry point map mapping the presentation time stamps to source packet addresses of the first video data,
   reproduce the first video data included in a first stream file recorded on the optical disk,
   read the second playlist file including at least one playitem identifying a pair of in-point and out-point pointing to presentation time stamps in a clip of second video data corresponding to a second reproduction path,
   read a second clip information file including a second entry point map mapping the presentation time stamps to source packet addresses of the second video data, and
   reproduce the second video data included in a second stream file recorded on the optical disk,
   wherein the first and second stream files, the first and second clip information files, the first and second playlist files and the navigation file are separate files from each other.

9. The apparatus of claim 8, wherein the first and second video data form different parental control reproduction paths, and the apparatus further comprises:
   an interface unit configured to communicate with the controller to select one of the different parental control reproduction paths.

10. The apparatus in claim 9, wherein the interface unit receives user input on the different parental control reproduction paths, and the controller controls the reproduction of the first and second video data based on the user input.

11. The method of claim 5, wherein the first path item further includes an attribute field indicating at least one attribute of the first path item, and the second path item further includes an attribute field indicating at least one attribute of the second path item.

12. The method of claim 5, wherein the navigation file further includes a field indicating the number of path items in the navigation file.

13. The method of claim 6, wherein the first path item further includes an attribute field indicating at least one attribute of the first path item, and the second path item further includes an attribute field indicating at least one attribute of the second path item.

14. The method of claim 6, wherein the navigation file further includes a field indicating the number of path items in the navigation file.

15. The apparatus of claim 7, wherein the first path item further includes an attribute field indicating at least one attribute of the first path item, and the second path item further includes an attribute field indicating at least one attribute of the second path item.

16. The apparatus of claim 7, wherein the navigation file further includes a field indicating the number of path items in the navigation file.

17. The apparatus of claim 8, wherein the first path item further includes an attribute field indicating at least one attribute of the first path item, and the second path item further includes an attribute field indicating at least one attribute of the second path item.

18. The apparatus of claim 8, wherein the navigation file further includes a field indicating the number of path items in the navigation file.

19. The optical disk of claim 1, wherein the first path item includes a third navigation command for proceeding to a third path item, and the second path item includes a fourth navigation command for proceeding the third path item.

20. The method of claim 5, wherein the first path item includes a third navigation command for proceeding to a third path item, and the second path item includes a fourth navigation command for proceeding the third path item.

21. The method of claim 6, wherein the first path item includes a third navigation command for proceeding to a third path item, and the second path item includes a fourth navigation command for proceeding the third path item.

22. The apparatus of claim 7, wherein the first path item includes a third navigation command for proceeding to a third path item, and the second path item includes a fourth navigation command for proceeding the third path item.

23. The apparatus of claim 8, wherein the first path item includes a third navigation command for proceeding to a third path item, and the second path item includes a fourth navigation command for proceeding the third path item.

* * * * *